United States Patent
Green et al.

(10) Patent No.: US 10,181,811 B2
(45) Date of Patent: Jan. 15, 2019

(54) REGULATION OF ELECTRICAL GENERATOR OUTPUT

(71) Applicant: BDR Thermea Group B.V., Apeldoorn (NL)

(72) Inventors: Adam Henry Green, Apeldoorn (NL); Angel Torres-Perez, Apeldoorn (NL); Mícheál Gerard McArdle, Apeldoorn (NL)

(73) Assignee: BDR Thermea Group B.V., Apeldoorn (NL)

( * ) Notice: Subject to any disclaimer, the term of this patent is extended or adjusted under 35 U.S.C. 154(b) by 58 days.

(21) Appl. No.: 14/915,277

(22) PCT Filed: Aug. 15, 2014

(86) PCT No.: PCT/EP2014/067515
§ 371 (c)(1),
(2) Date: Feb. 29, 2016

(87) PCT Pub. No.: WO2015/028323
PCT Pub. Date: Mar. 5, 2015

(65) Prior Publication Data
US 2016/0211785 A1 Jul. 21, 2016

(30) Foreign Application Priority Data
Aug. 30, 2013 (GB) .................................. 1315497.6

(51) Int. Cl.
*H02P 9/00* (2006.01)
*H02P 9/04* (2006.01)
*H02P 9/48* (2006.01)

(52) U.S. Cl.
CPC . *H02P 9/04* (2013.01); *H02P 9/48* (2013.01)

(58) Field of Classification Search
CPC ...................................... H02P 9/04; H02P 9/48
(Continued)

(56) References Cited

U.S. PATENT DOCUMENTS

| 3,560,834 A * | 2/1971 | Studtmann | H02M 1/08 318/807 |
| 3,808,481 A * | 4/1974 | Rippel | H02P 7/281 290/50 |

(Continued)

FOREIGN PATENT DOCUMENTS

| WO | WO 2010/023285 | 3/2010 |
| WO | WO 2015/028323 | 3/2015 |

OTHER PUBLICATIONS

International Search Report and the Written Opinion dated Jun. 12, 2015 From the International Searching Authority Re. Application No. PCT/EP2014/067515.
(Continued)

*Primary Examiner* — Julio C. Gonzalez Ramirez

(57) ABSTRACT

To regulate the electrical output of a generator, a signal is received indicative of at least one characteristic of the electrical output. A first, relatively fast-response sub-controller is configured to provide a first control signal on the basis of the at least one characteristic and a second, relatively slow-response sub-controller is configured to provide a second control signal on the basis of the at least one characteristic. An output provides a combined control signal to adjust the electrical output based on the first and second control signals.

20 Claims, 18 Drawing Sheets

(58) Field of Classification Search
USPC ............ 322/24, 89, 59, 20, 3; 323/234, 283
See application file for complete search history.

(56) References Cited

U.S. PATENT DOCUMENTS

| | | | | |
|---|---|---|---|---|
| 4,689,546 | A * | 8/1987 | Stephens | G01R 15/00 310/176 |
| 5,055,765 | A * | 10/1991 | Rozman | F02N 11/04 322/22 |
| 5,083,077 | A * | 1/1992 | Wallace | H02P 9/007 318/729 |
| 8,193,785 | B2 * | 6/2012 | Peto | H02M 5/293 323/224 |
| 8,253,393 | B2 * | 8/2012 | Bo | F03D 7/0272 290/44 |
| 8,593,087 | B2 * | 11/2013 | Terada | H02P 21/0035 318/400.01 |
| 2005/0007061 | A1 | 1/2005 | Hofmann et al. | |
| 2007/0108771 | A1 * | 5/2007 | Jones | H02P 9/102 290/44 |
| 2007/0159139 | A1 * | 7/2007 | Yao | H02P 9/30 322/25 |
| 2008/0122408 | A1 * | 5/2008 | Keiter | F02D 29/06 322/28 |
| 2009/0167268 | A1 * | 7/2009 | Peto | H02M 5/293 323/282 |
| 2011/0298405 | A1 * | 12/2011 | Costanzo | H02P 29/50 318/400.23 |
| 2012/0049782 | A1 * | 3/2012 | Suzuki | H02M 1/14 318/807 |
| 2013/0154528 | A1 * | 6/2013 | Hung | H02P 6/181 318/400.07 |
| 2016/0028340 | A1 * | 1/2016 | Nakai | H02P 21/05 318/400.02 |
| 2016/0123305 | A1 * | 5/2016 | Deng | H02P 9/006 322/27 |
| 2016/0190972 | A1 * | 6/2016 | Mori | H02M 7/53873 318/490 |
| 2017/0019047 | A1 * | 1/2017 | Rozman | H02P 9/48 |

OTHER PUBLICATIONS

Patent Act 1977: Search Report Under Section 17(5) dated Mar. 14, 2014 From the Intellectual Property Office of the United Kingdom of Great Britain Re. Application No. GB1315497.6.

* cited by examiner

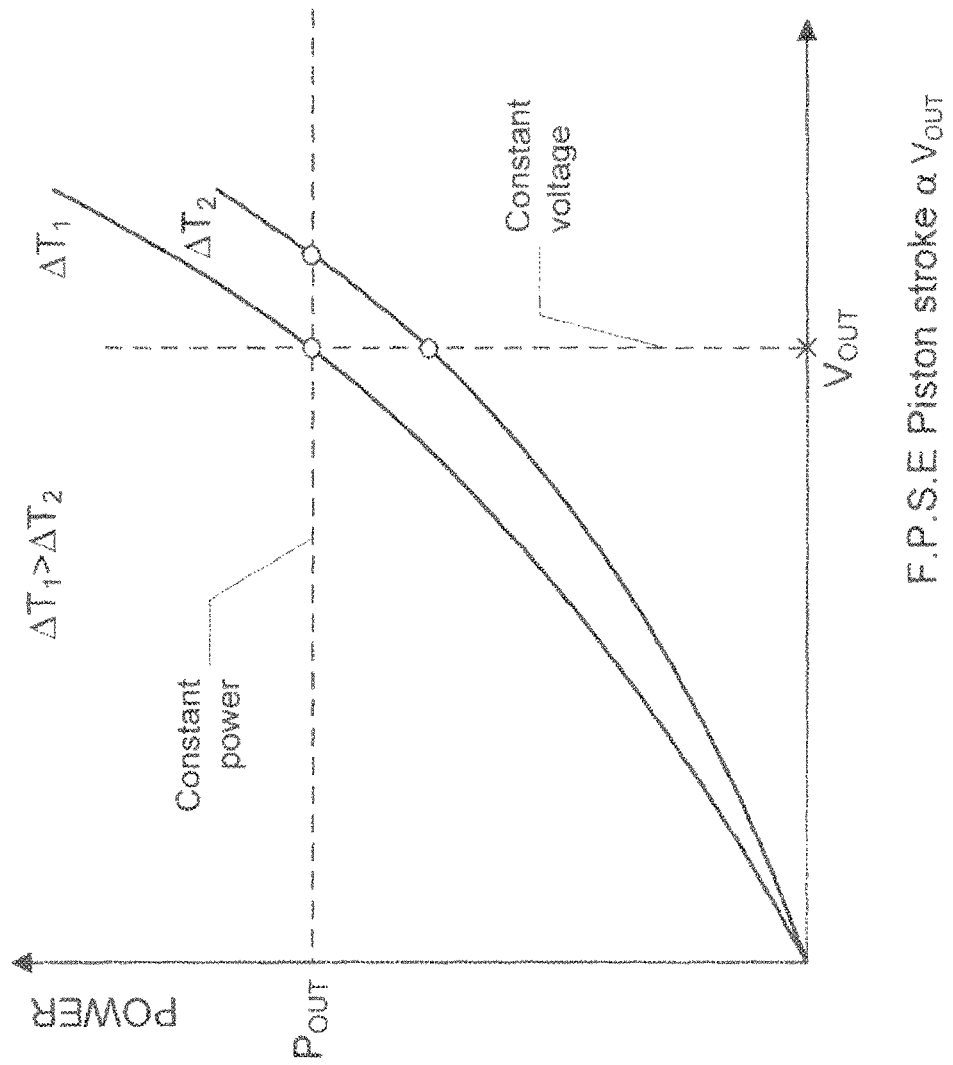

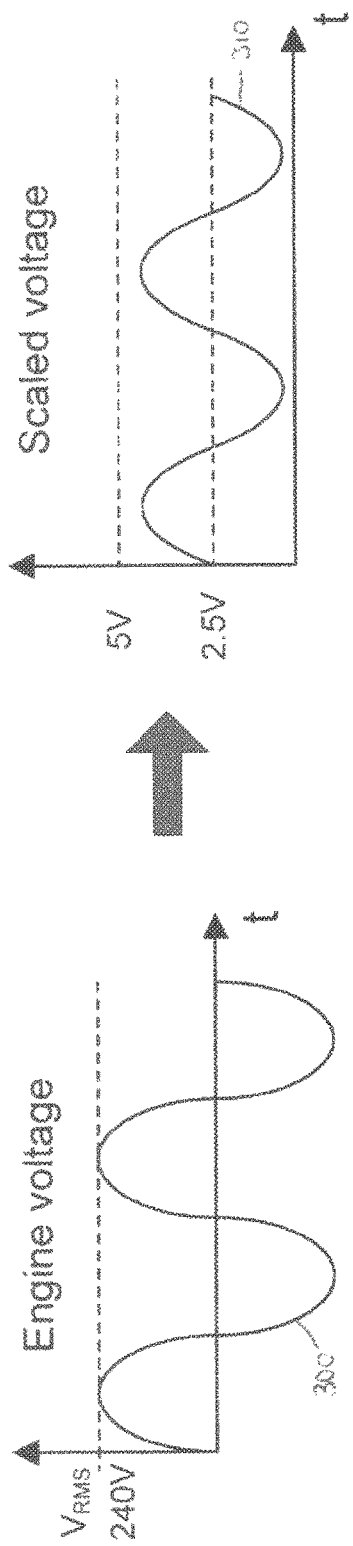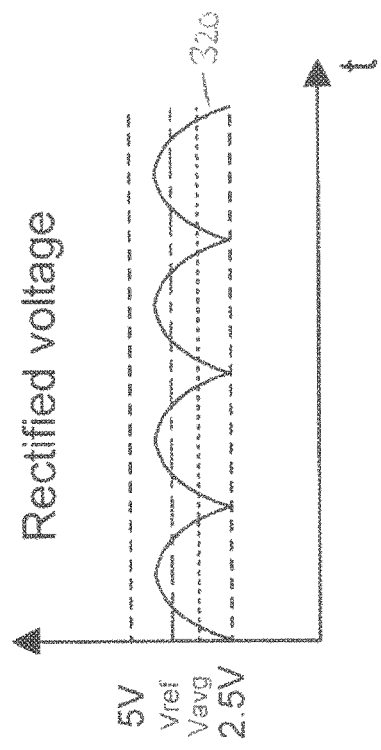
Fig. 5A
Fig. 5B

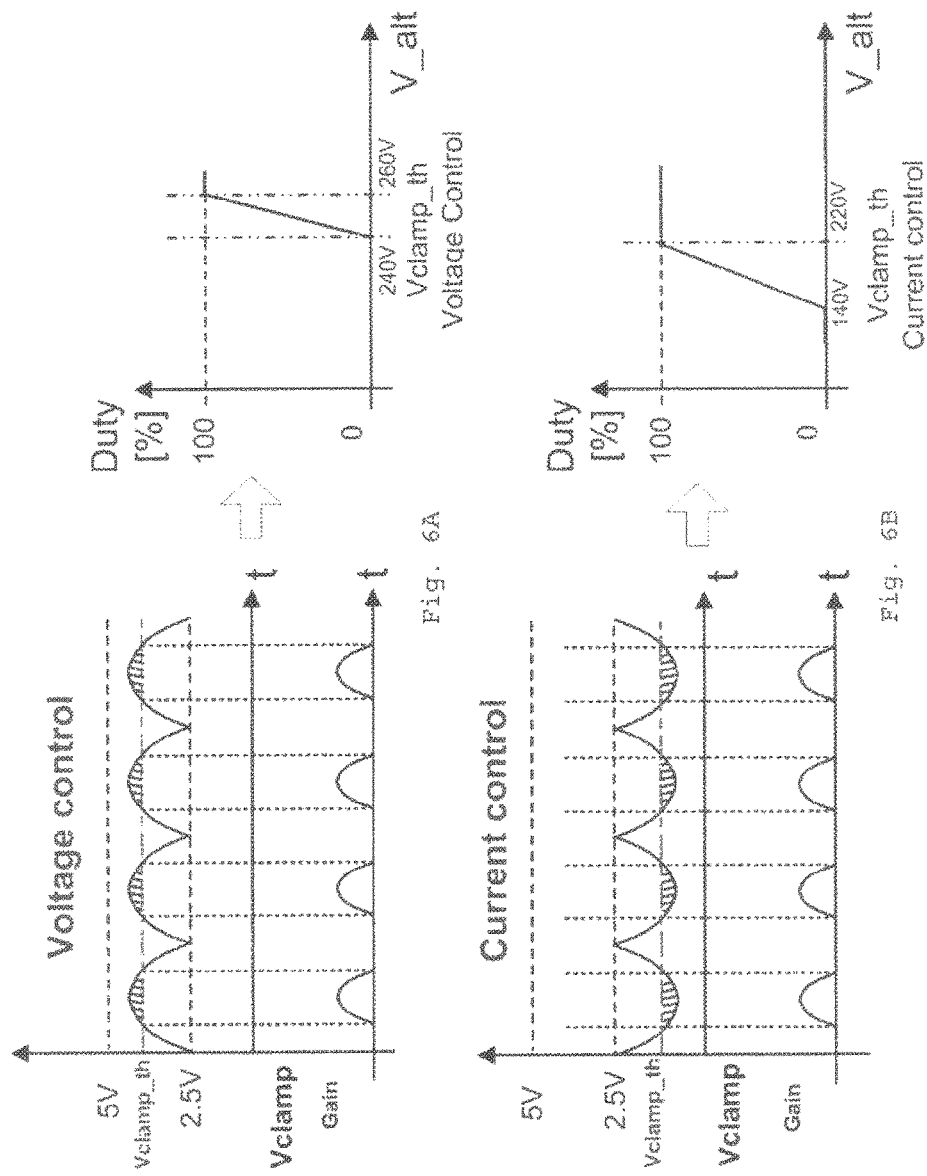

REGULATION OF ELECTRICAL GENERATOR OUTPUT

RELATED APPLICATIONS

This application is a National Phase of PCT Patent Application No. PCT/EP2014/067515 having International filing date of Aug. 15, 2014, which claims the benefit of priority of Great Britain Patent Application No. 1315497.6 filed on Aug. 30, 2013. The contents of the above applications are all incorporated by reference as if fully set forth herein in their entirety.

FIELD AND BACKGROUND OF THE INVENTION

The invention concerns a regulator for the electrical output of a generator, in particular wherein the generator comprises a Stirling engine (especially a linear free piston Stirling engine with linear alternator) and a method of regulating the electrical output of such a generator.

The application of a Free Piston Stirling Engine (FPSE) with a Linear Alternator (LA) to generate electricity in Domestic Combined Heat and Power (DCHP) units that provide hot water and central heating in a domestic environment is well known. Referring to FIG. 1, there is shown a typical power characteristic curve of a FPSE/LA, which is similar to that shown in U.S. Pat. No. 4,642,547. The power output of a FPSE/LA therefore depends on the head temperature. It may be understood that the amplitude and polarity of magnetic flux created by the permanent magnets changes when the power piston moves relative to the armature winding (stator). Power modulation methods which are drawn in FIG. 1 may include operating at a constant voltage or at a constant output power.

As explained in U.S. Pat. No. 4,873,826, the output power of a FPSE/LA is a function of the engine heat exchanger temperature ratio (in accordance with Carnot), operating frequency, mean pressure, and volumetric displacement of the displacer and the power piston. This document and U.S. Pat. No. 6,871,495 propose power modulation techniques based on mechanical controls. These present several drawbacks such as slow transient response, low reliability and higher cost.

However, power modulation can be achieved in the electrical side by means of regulating the load connected to the FPSE/LA which indirectly controls the current flowing through the alternator. The mechanical force acting on the piston ($F_p$) is proportional to the current flowing through the stator coil (i) and it provides an effective inertial load to the FPSE. This is shown with variation in time (t) in the equation below, where $\alpha$ is the LA motor constant.

$$F_p(t) = \alpha \cdot i(t).$$

It is therefore desirable that such low-inertia generators can be provided with a suitable impedance across the generator terminals, irrespective of load demand. An impedance sensed by the alternator that is too high or too low could result in over-voltage, waveform distortion, and in extreme cases (such as an open or short circuit) physical damage of the generator engine.

The engine or alternator are normally assured of being presented with a reasonably stable impedance when connected directly to the electrical mains supply. However, there is often no inherent protection for the engine or alternator if they are used to provide electrical energy to connected appliances when disconnected from electrical mains, as in the case of a grid power blackout. A large number of techniques have been proposed for regulating the voltage in such scenarios.

As explained in U.S. Pat. No. 6,856,107, the induced voltage may be determined by assuming a sinusoidal flux waveform and, according to Faraday's law, its peak value is proportional to the amplitude of the power piston position. As can be seen from FIG. 1, the relationship between generated power and voltage seems to follow a quadratic relationship when the engine operates at a constant temperature gradient. Power modulation is performed modifying the operation point of the FPSE/LA, by controlling the head temperature and the load connected to the FPSE/LA.

Several power modulation control methods are known for keeping a constant displacer-to-piston stroke ratio and their relative phase angle by controlling the load connected to the FPSE/LA. A simple control strategy is described in U.S. Pat. No. 4,873,826, in which the winding ratio of an autotransformer is adjusted to maintain a constant voltage after the tuning capacitor. This strategy may be suitable for grid and off-grid applications. Another control method suitable for laboratory testing is based on a variable frequency power supply (inverter at a fixed output voltage), one autotransformer and a ballast load which is shown in U.S. Pat. No. 7,200,994.

Other approaches use an electronic load, which is a circuit that exploits the electrical characteristics of a power electronics topology in order to control the load impedance. Several known power electronic topologies may implement an electronic load. For example, U.S. Pat. No. 6,871,495 describes connecting different resistive loads to achieve voltage regulation in a DC bus, which is the rectified FPSE/LA output voltage after a tuning capacitor. To overcome the disadvantages of using a tuning capacitor to compensate the winding inductance of the alternator, an active rectifier has also been proposed in U.S. Pat. No. 6,856,107, U.S. Pat. No. 7,453,241 and U.S. Pat. No. 6,871,495. As suggested in U.S. Pat. No. 7,453,241 and U.S. Pat. No. 6,871,495, the active rectifier bridge transistors may be switched to control the phase of a SPWM (Sinusoidal Pulse Width Modulation) signal, until the alternator current is in phase with piston position or alternator EMF. The load is then connected in the DC bus and regulated using a voltage controller.

Several analogue and digital control techniques were proposed for the electronic loads to achieve power modulation of a Stirling engine. U.S. Pat. No. 7,453,241 proposes a strategy based on a constant voltage control in the DC bus side by means of using a hysteresis controller. US-2009/224738 and U.S. Pat. No. 6,871,495 consider digital control techniques using a reference sine wave in synchronism (or phase) with the FPSE/LA piston position or EMF.

Referring first to FIG. 2A, there is shown a first equivalent circuit for an existing regulator technology, which seeks to ensure a stable impedance in such cases using an electronic load. A generator comprising a FPSE/LA 10 has a tuning capacitance 12. The output voltage of the generator is measured by voltmeter 14 and an electronic load 22 is also across the generator output. The electronic load 22 is controlled by a voltage controller 20, which bases its control on the voltage measured by voltmeter 14.

However under such conditions, the load actually corresponds to the connected appliances that are connected across the electrical output of the alternator. These are termed customer loads and they may vary from zero up to the full rated output of the alternator. Desirably, the power of the engine should power up customer loads instead of damping the FPSE/LA generated power without any particular use.

Referring next to FIG. 2B, there is shown a second equivalent circuit for an existing regulator technology, which has similar components to those of FIG. 2A and these are identified by identical reference numerals. Customer load 30 is also across the generator output. When appliances are first connected to the generator these loads may demand "inrush" currents that are greatly in excess of those normally provided by the alternator. Inductive loads could also require high levels of current for short periods of time. Therefore, an adequate regulation strategy is demanded to ensure that such a low inertia generator is presented with stable impedance under all load demand conditions. Therefore, typical power modulation techniques are based on controlling the impedance connected to the FPSE/LA as it can provide control of the displacer to piston stroke ratio and their relative phase angle.

Referring now to FIG. 2C, there is shown a third equivalent circuit for an existing regulator technology, which has similar components to those of FIGS. 2A and 2B and these are identified by identical reference numerals. In addition to the voltage control 20, a power control block 40 is also placed at the generator output. An equivalent circuit for a regulator technology in accordance with US-2009/189589 (commonly assigned with this invention) is shown in FIG. 2D. Again, where the same components as those of FIG. 2C are used, they are identified by identical reference numerals. The power control block 40 of FIG. 2C comprises a voltmeter 46 and a current meter 48, which provide measurements to power control block 42. This controls an AC chopper 44 to affect the output voltage across the customer loads 30.

Determining the control signals for the voltage control block 20 and power control block 42 is not straightforward. US-2009/189589 suggests a technique for determining an error signal that can be used to modulate the AC input signal in order to obtain a regulated AC output signal. Referring now to FIG. 3A, there is shown a schematic diagram of a method for regulating the AC signal, as described in this document. The AC input signal is sampled to produce a sampled AC signal as shown by input waveform 52. This is provided to full-wave rectifier 56 and the rectified AC signal 58 results. In parallel, the sampled AC signal 52 may be used to generate trigger pulses 62 to coincide with the sampled AC signal 52 crossing through zero volts. This zero crossing may be detected using software and may use digital filtering to remove the effects of noise around the zero crossing and make use of software pattern matching to improve face synchronisation. A computer 64 uses these trigger pulses 62 to generate a synchronised reference signal 66. The reference signal 66 corresponds to a sinusoid, but with only positively extending lobes such that it is equivalent to a full-wave rectified AC signal.

In ratio-metric comparison block 70, the scaled AC signal 58 is subtracted from the reference signal 66 to produce an error signal 72. In other words, instantaneous values are subtracted from instantaneous values. To ensure that only positive values are obtained, an offset is introduced. For example, this subtraction may be implemented in a difference amplifier operating with a suitable offset.

This error signal 72 is not only a function of the amplitude difference between the scaled AC signal 58 and the reference signal 66, it is also a function of the phase of the AC input signal. This phase variation may be removed by a multiplier chip 76 that operates to divide the error signal by the reference signal 66 to provide a percentage error signal 78. This percentage error signal 78 may then be used to modulate the AC input signal.

This is a relatively fast-response control loop, as instantaneous changes in the error signal are immediately reflected in changes to the modulation. Referring now to FIG. 3B, there is shown a further schematic diagram, illustrating the generation of the exact error signal for controlling the modulation. The AC input voltage 52 and the design output voltage 66 are provided to the ratio-metric comparison block 70, which generates the percentage error signal 72. This is passed to a proportional controller 76 which generates the analogue error signal 78. This is compared with the output of a ramp generator 77 using a comparator 79 to generate a Pulse Width Modulation (PWM) signal 81, which is fed to an electronic load such as an AC/AC Buck regulator (not shown), also called an AC/AC chopper.

This control strategy and error definition effect power control (that is, regulation of the voltage when it begins to drop, indicating that a higher than normal load is being applied), because the error signal is positive when the generator output (as scaled) is less than the reference signal. This may deal with in-rush currents, as explained above. The error definition changes when voltage control is required (that is, regulation of the voltage when the load applied is within a normal range), such that the error signal is positive when the generator output (as scaled) is greater than the reference signal.

By generating an error signal that is expressed as a fraction (that is, a percentage) of the reference signal, the error signal magnitude is essentially independent from the LFPSE/LA AC voltage level. This makes it suitable for use with a fast proportional controller, such as proportional controller 76. This complex control strategy appears to be well-suited to generators based on low inertia engines, for example, Stirling engines, in which a regulation strategy that minimises the risk of mechanical failure is demanded. However, it requires a significant amount of regulation-specific processing.

SUMMARY OF THE INVENTION

Against this background, the present invention provides a regulator for the electrical output of a generator, comprising: an input for receiving a signal indicative of at least one characteristic of the electrical output; a first, relatively fast-response sub-controller configured to provide a first control signal on the basis of the at least one characteristic; a second, relatively slow-response sub-controller configured to provide a second control signal on the basis of the at least one characteristic; and an output, arranged to provide a combined control signal to adjust the electrical output based on the first and second control signals.

This approach regulates the generator output using two simple control loops: a fast-response controller; and a slow-response controller. Whilst a complex fast-response controller relying on instantaneous or near-instantaneous measurement has been used in existing systems, by replacing this with two simpler controllers, the overall regulator is less complex, costly, power consuming and easier to manage. A slow-response controller can be based on statistics of the input, such as an average, particularly a time-averaged input.

Preferably, the generator comprises a Stirling engine. In the preferred embodiment, the generator comprises a Free Piston Stirling Engine (FPSE) or a Linear Free Piston Stirling Engine (LFPSE). This may be used together with a Linear Alternator (LA). The combination may be referred to as FPSE/LA or LFPSE/LA. Generators comprising another type of low inertia engine may also be considered, such as thermoacoustic engines.

The first and second sub-controllers are typically of different types. The first sub-controller is preferably a feed-forward controller and more preferably comprises a clamp controller. Additionally (or alternatively), the second sub-controller may comprise an error compensator, as is known for a typical Single Input Single Output (SISO) control strategy. A range of types of error compensator can be used. The preferred type is a form of Proportional-Integral-Derivative (PID) controller. This may be a Proportional controller or a Proportional-Integral (PI) controller in preferred embodiments. This may be easier to tune and it may work well when the plant (that is, the generator) characteristic is unknown. Other types of error compensator may include lead and lag compensators, as long as the closed system response is stable.

Advantageously, the second sub-controller uses a DC level as a reference (particularly when the second sub-controller comprises a PID-type of controller). This assists in making the regulator less complex and prone to problems, because it is not necessary to synchronise the reference voltage with the generator output when a DC level is used. Moreover, it is easier to generate a stable DC level. Additionally or alternatively, the second sub-controller beneficially compares a time-averaged value for the at least one characteristic of the electrical output with a reference. This provides a simple and efficient slow-response sub-controller. Moreover, the controller can also cope with non-sinusoidal waveforms as well as sinusoidal ones.

The at least one characteristic may comprise one or more of the: voltage; current; and power of the electrical output. In preferred embodiments, only the voltage is used.

In one embodiment, the first and second sub-controllers are configured for a voltage control mode. The voltage control mode may regulate the voltage on the basis that the load impedance (or resistance in the usual case where no reactive loads are applied) is greater than a rated value.

In another embodiment, the first and second sub-controllers are configured for a current control mode. Contrastingly, the current control mode may regulate the voltage on the basis that the load impedance (or again, resistance) may be lower than the rated level and, as a consequence, excess power is being generated that needs to be safely dissipated. If the generator is overloaded, this generally means that the load impedance connected to it is lower than a desired value (a "desired impedance"). The lower the value of the impedance connected to the generator, the greater is the current for a given voltage (in other words, the greater the output power). The current control mode may be used when there is a high demand of current, which is seen as the load impedance being lower than the desired impedance. The voltage control mode may address the situation when the load impedance increases at constant power output, thereby causing the voltage to increase.

Preferably, the first sub-controller is configured to provide a first current-control signal and a first voltage-control signal. Thus, the first control signal may comprise a first current-control signal and a first voltage-control signal. Then, the second sub-controller may be configured to provide a second current-control signal and a second voltage-control signal. Thus, the second control signal comprises a second current-control signal and a second voltage-control signal. Here, the output may be arranged to provide the combined control signal comprising: a combined current-control signal to adjust the electrical output based on the first and second current-control signals and a combined voltage-control signal to adjust the electrical output based on the first and second voltage-control signals.

In the preferred embodiment, the first sub-controller comprises: a first current-control sub-controller configured to provide the first current-control signal on the basis of the at least one characteristic; and a first voltage-control sub-controller, configured to provide a first voltage-control signal on the basis of the at least one characteristic. Then, the second sub-controller may comprise: a second current-control sub-controller, configured to provide the second current-control signal on the basis of the at least one characteristic; and a second voltage-control sub-controller, configured to provide the second voltage-control signal on the basis of the at least one characteristic.

Each of the first and second sub-controllers may comprise a respective error signal generator. Each error signal generator may be configured to generate a respective error signal by comparing the at least one characteristic with a respective reference value. Also, each error signal generator may be further configured to generate the respective control signal so as to minimise the respective error signal. The first and second sub-controllers may be configured to generate the respective error signal by determining the difference between the at least one characteristic and the respective reference value. Each of the first and second current-control sub-controllers may generate the respective error signal by determining a difference between the at least one characteristic and the respective reference value. If the at least one characteristic comprises voltage or displacement, the first and second current-control sub-controllers may generate the respective error signal by subtracting the at least one characteristic from the respective reference value. If the at least one characteristic comprises current or power, the first and second current-control sub-controllers may generate the respective error signal by subtracting the respective reference value from the at least one characteristic.

Advantageously, the combined control signal comprises at least one Pulse Width Modulation, PWM, signal. In the preferred embodiment, the combined control signal comprises: the combined current-control signal; and the combined voltage-control signal, each of which comprises a PWM signal. Advantageously, the first and second control signals are PWM signals (and likewise, the first and second current-control signals and the first and second voltage-control signals). The combined control signal (or signals) may then be relatively simple to generate by applying a logical OR operator to the respective first and second control signals.

In some embodiments, the input comprises terminals configured to receive the electrical output from the electrical generator. Then, the regulator may further comprise an electronic load, arranged across the input terminals and configured to receive the combined control signal (preferably, the combined voltage-control signal) from the output and to set its resistance based on the received combined control signal, to adjust the electrical output thereby. Electronic loads may provide a fast, reliable and cost effective way to control impedance. The electronic load may take the form of a DC chopper (for instance, comprising a power electronics converter, such as a buck, boost or flyback topology, coupled to a fixed load) or some other form of electronically controlled resistance. This may be located after a tuning capacitor at the output of the generator. Advantageously, the electronic load is responsive to the combined voltage-control signal. Alternatively, it may be deactivated and basically provide an open circuit (effectively infinite resistance).

Preferably additionally (although possibly alternatively), the regulator may further comprise an AC converter, arranged at the input terminals and configured to receive the combined control signal from the output and to adjust the electrical output in accordance with the received combined control signal. Again, the AC converter is beneficially responsive to the combined current-control signal. Otherwise, it may be deactivated. The output (or load) may be automatically disconnected (or de-energised). The AC converter may be an AC/AC converter, such as an AC chopper (AC/AC buck, boost or full bridge, for example) or an AC/DC converter.

The input is beneficially configured to receive the electrical output from the electrical generator. Then, the input may comprise a signal processing module arranged to generate a second signal indicative of the at least one characteristic by processing of the electrical output. The first and second sub-controllers are advantageously responsive to the second signal indicative of the at least one characteristic. Optionally, the signal processing module is configured to generate the second signal indicative of the at least one characteristic as a scaled version of the electrical output. Advantageously, the signal processing module is configured to generate the second signal indicative of the at least one characteristic as a rectified version of the electrical output.

In a second aspect, there is provided a method of regulating the electrical output of a generator, comprising: receiving a signal indicative of at least one characteristic of the electrical output; generating a first control signal on the basis of the at least one characteristic using a first, relatively fast-response sub-controller; generating a second control signal on the basis of the at least one characteristic using a second, relatively slow-response sub-controller; and adjusting the electrical output using a combined control signal that is based on the first and second control signals.

It will be understood that this method may comprise optional method steps corresponding with any one or more of the apparatus features defined herein. It will also be appreciated that the present invention may be found in programmable logic (such as a Complex programmable logic device, CPLD, Digital Signal Processor, DSP, or Field Programmable Gate Array, FPGA) configured to carry out any method as disclosed herein or a computer program, configured when operated on a processor to carry out any method as disclosed herein.

The combination of any of the apparatus or method features described herein or both is also provided even if not explicitly disclosed.

BRIEF DESCRIPTION OF THE SEVERAL VIEWS OF THE DRAWINGS

The invention may be put into practice in various ways, one of which will now be described by way of example only and with reference to the accompanying drawings in which:

FIG. 1 shows a power characteristic of a generator based on a Free Piston Stirling Engine with a Linear Alternator (FPSE/LA);

FIGS. 5A and 5B illustrate example voltage waveforms as part of the generation of an error signal in accordance with the embodiment of FIGS. 4A and 4B;

FIGS. 6A and 6B depict example voltage waveforms and duty cycle characteristics for the operation of a clamp controller in accordance with the embodiment of FIGS. 4A and 4B respectively;

DESCRIPTION OF SPECIFIC EMBODIMENTS OF THE INVENTION

Figure 2A:
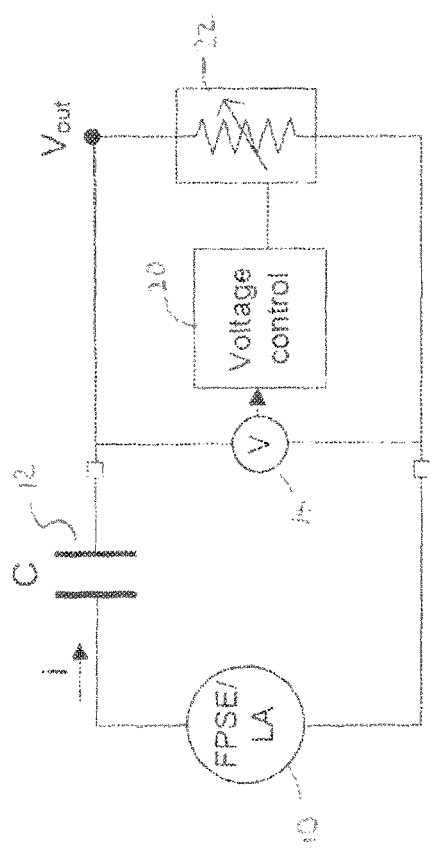
FIGS. 2A, 2B, 2C and 2D depict equivalent circuits for existing regulator technologies.
Figure 2B:
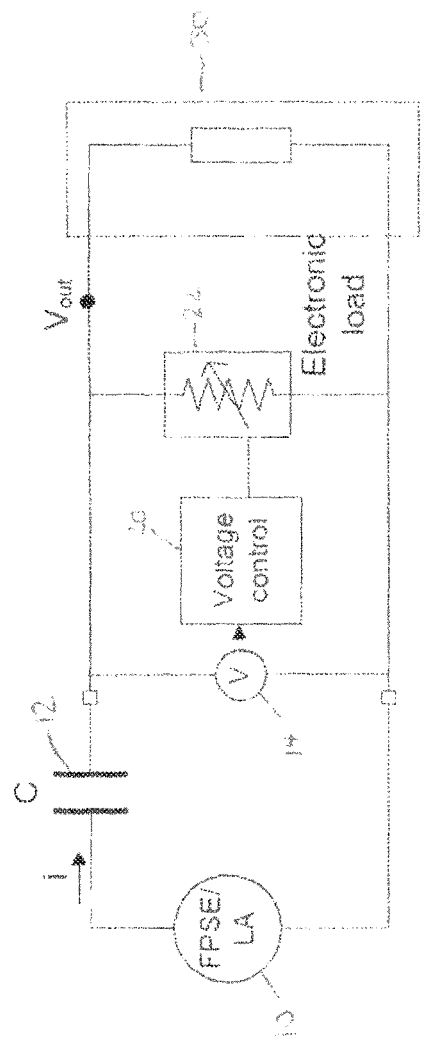
Figure 2C:
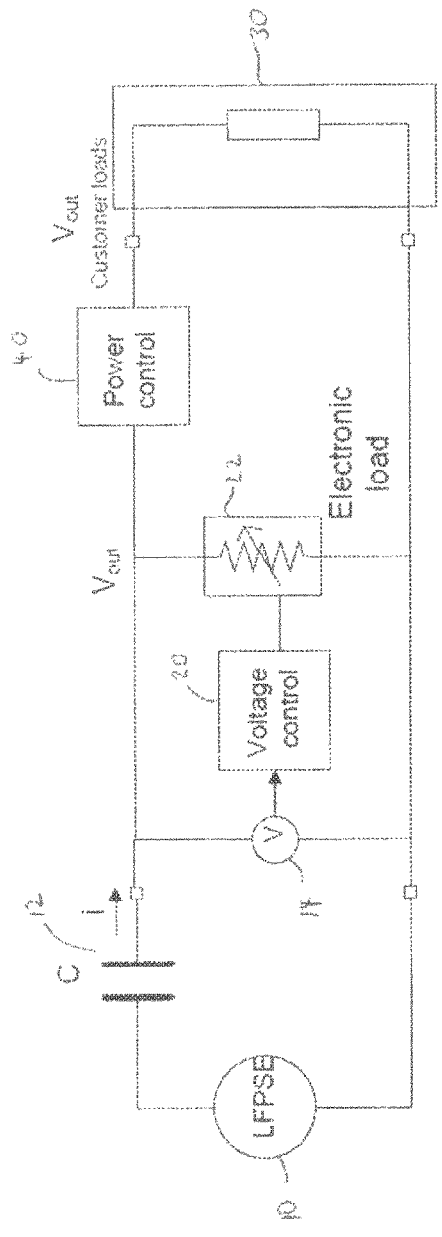
Figure 2D:
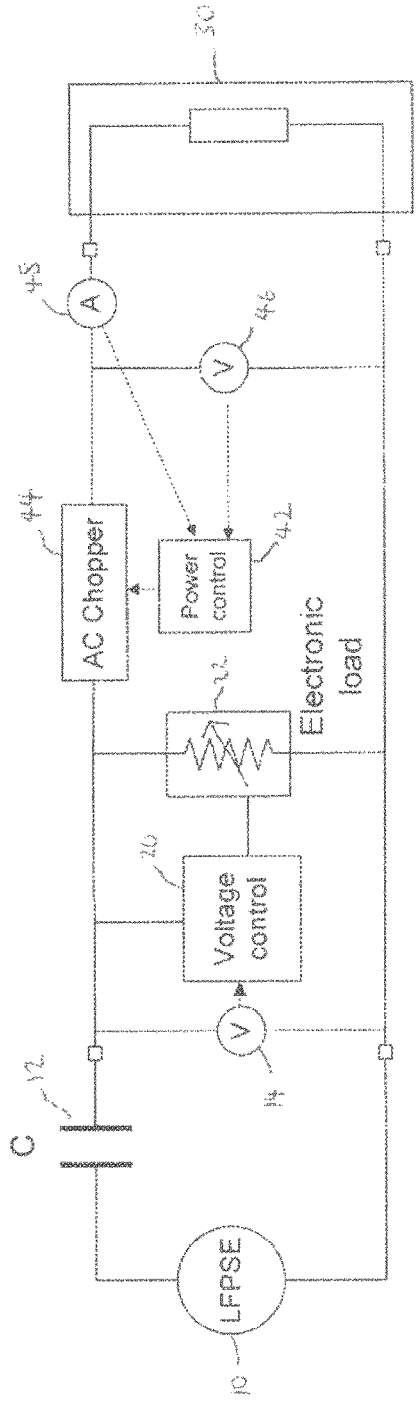
Figure 2E:
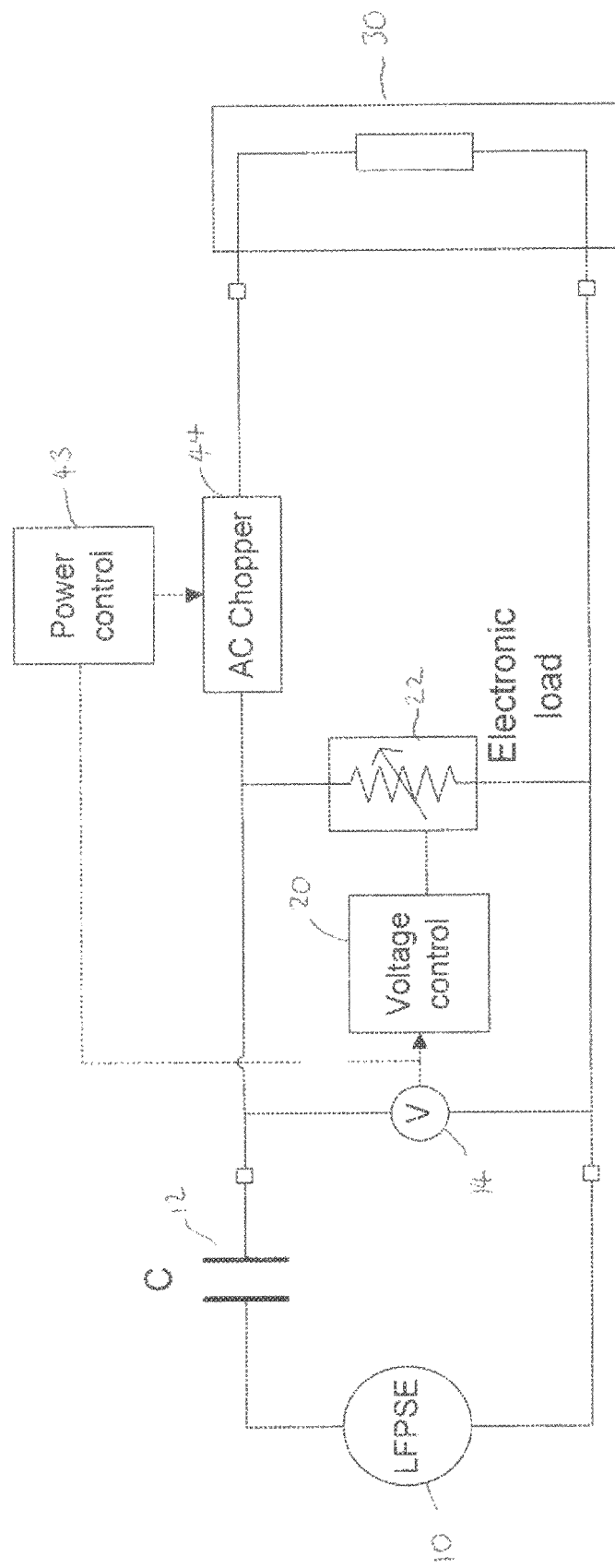
FIG. 2E illustrates an equivalent circuit for a regulator technology in accordance with the invention.
Figures 3A, 3B:
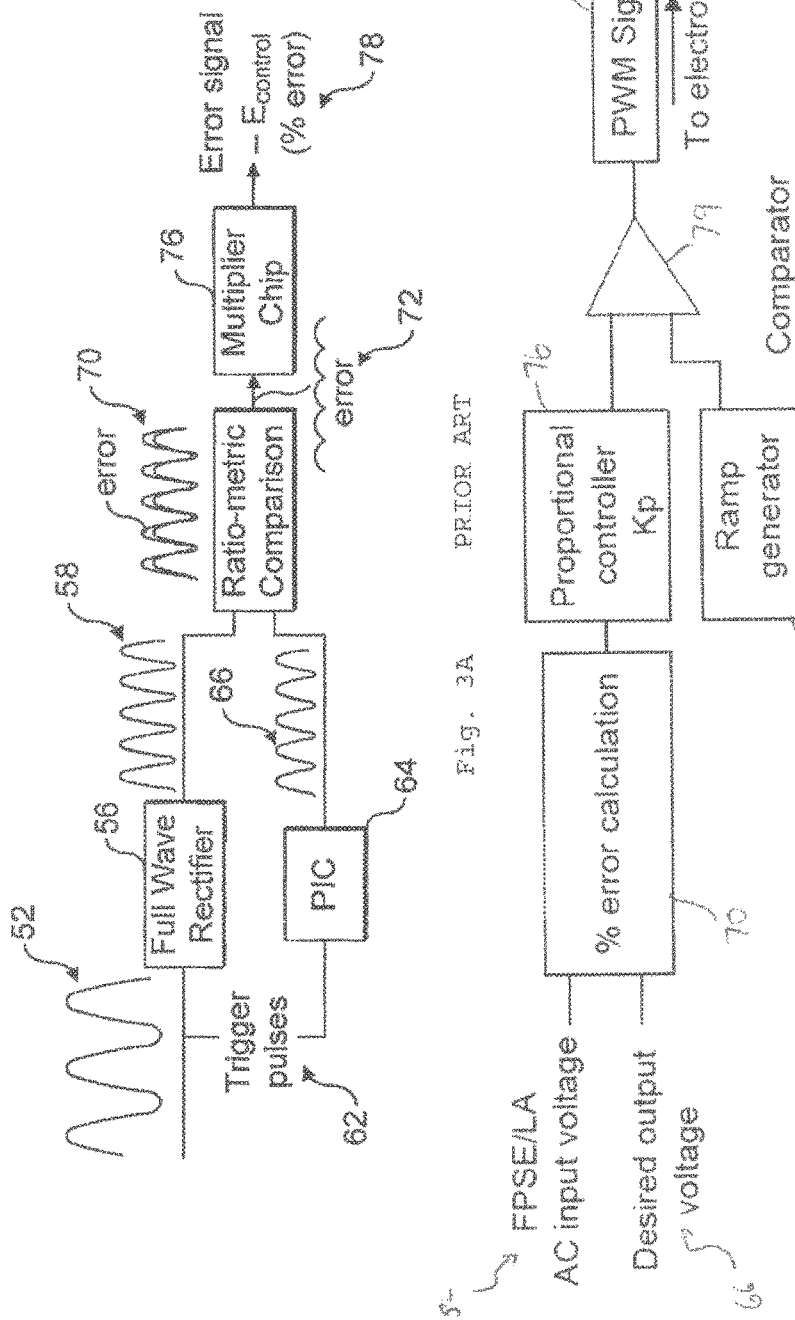
FIGS. 3A and 3B show schematic diagrams for a known approach to generating an error signal for regulation of the output voltage for a generator based on a FPSE/LA.

Referring first to FIG. 2E, there is shown an equivalent circuit for a regulator technology in accordance with the invention. Some of the components of this circuit are the same as FIG. 2D and these are indicated by identical reference numerals. A power control block 43 uses the voltage measured by voltmeter 14 to generate a control signal for the AC chopper 44. Thus, a current meter and a second voltmeter are not needed. This circuit is intended to form a bridge between the alternator of a DCHP unit (of which the LFPSE 10 forms a part), an electrical grid and also local electrical appliances to ensure that the signal produced by the alternator is suitable for injection into the grid, supply to the connected appliances or both.

Control Approach

Figures 4A, 4B:
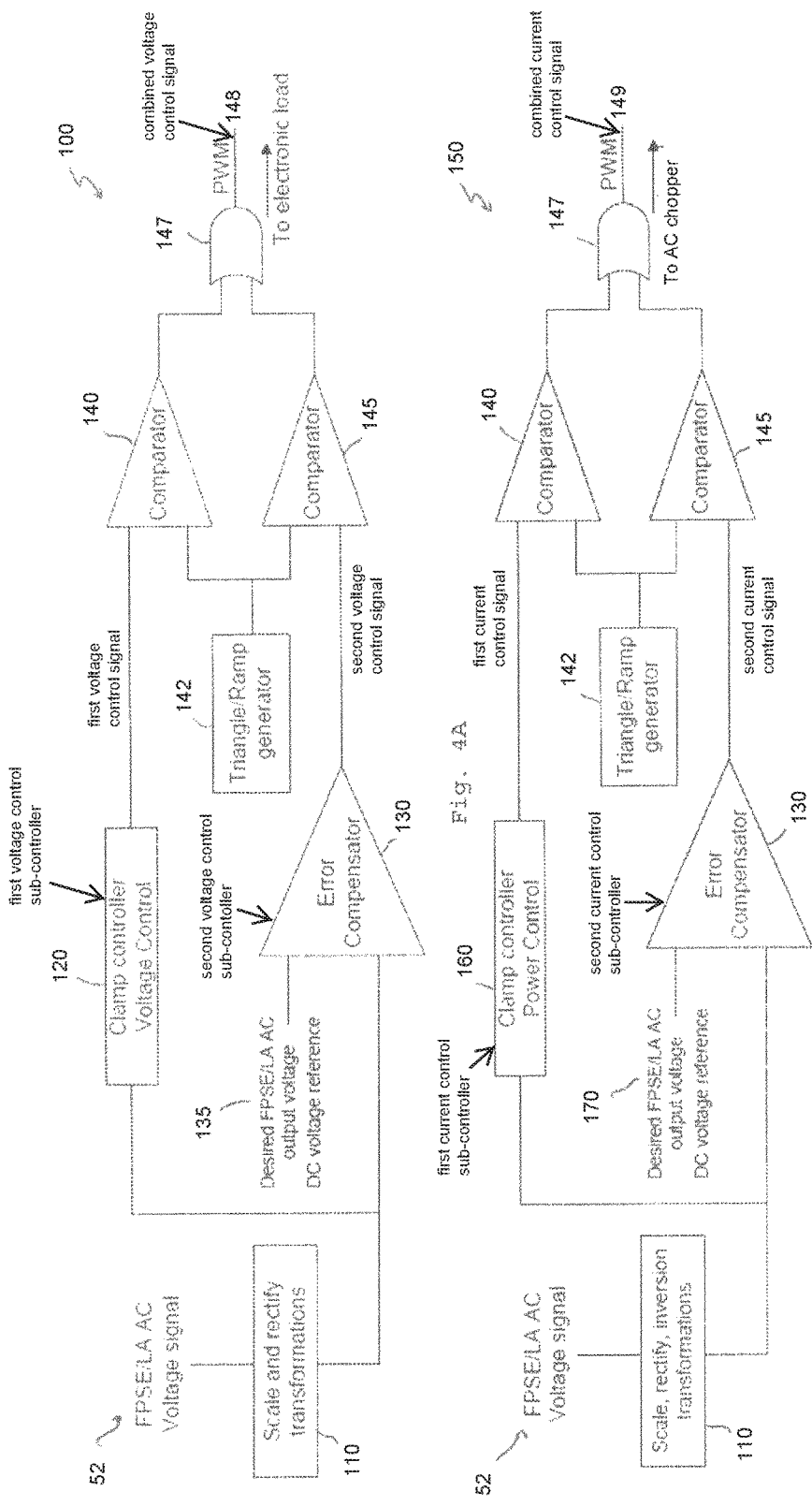
FIGS. 4A and 4B show schematic diagrams for an approach to generating an error signal for regulation of the output voltage for a generator based on a FPSE/LA in accordance with the present invention.

Referring next to FIG. 4A, there is shown a schematic diagram for an approach to generating an error signal for regulation of the output voltage for a generator based on a FPSE/LA. This is embodied as a voltage control block 100. Where the features of this approach are the same as other drawings, these are indicated by identical reference numerals. Two controllers act in parallel depending on the FPSE/LA output voltage 52. These are a clamp controller 120 and an error compensator 130. The block diagram also comprises: a scaling and rectification block 110; a triangle or ramp signal generator 142; a first comparator 140; a second comparator 145; and a logical OR gate 147.

An output of a precision rectifier in the scaling and rectification block 110 is provided to an overvoltage protection block (not shown). The output of the overvoltage protection block provides an interface to an external shutdown circuit (as described below). The scaling and rectification block 110 also provides an input to the clamp controller 120 and the error compensator 130.

The clamp controller 120 provides a relatively fast acting response, to ensure there is load present on the engine when the voltage of the FPSE/LA is larger than a certain threshold. The clamp controller 120 provides fast transient changes in the load connected to the generator.

The error compensator 130 provides a relatively slow acting response controller. It is intended to achieve long term load regulation. The error compensator is based on a Proportional-Integral (PI) controller.

Both the clamp controller 120 and the error compensator 130 receive the same input, which a scaled and rectified version of the FPSE/LA AC output from the scaling and rectification block 110. The error compensator 130 acts in part as a comparator, comparing the scaled and rectified version of the FPSE/LA AC output with a DC voltage reference 135. The DC voltage reference 135 represents the desired FPSE/LA output voltage.

The clamp controller 120 and the error compensator 130 each provide a respective output. These are two control signals for adjusting the output voltage seen by customer loads. Each of these two signals is then provided to a respective comparator 140, 145. The other input to the first comparator 140 and the second comparator 145 is commonly provided by the output of the triangle or ramp signal generator 142. Thus, the output of each of the first comparator 140 and the second comparator 145 is a Pulse Width Modulation (PWM) signal. These PWM control signals are combined using logical OR gate 147 to provide a single PWM voltage control signal 148, which is provided to the electronic load 22. The electronic load 22 can be used to dissipate power as heat and may form part of a heating system, such as an immersion heater for generating hot water.

A circuit in accordance with this block diagram is implemented using relatively low cost analogue electronics and it does not require any microcontroller or expensive analogue multipliers. It also provides good output voltage regulation with relatively few components and as a single supply circuit.

The clamp controller 120 and error compensator 130 are designed for a voltage control mode, in which the voltage output from the FPSE/LA is no lower than a desired level. In this case, the impedance seen by the linear alternator can be decreased in order to dissipate excess power generated by the FPSE/LA and avoid the voltage seen at the customer load increasing. However, it does not deal with high inrush currents due to transient or reactive loads.

In order to overcome this problem, another extra control system may be provided to check that:
- the power demanded from the customer loads does not exceed the maximum power available for a given FPSE/LA voltage;
- the current demanded from the alternator is not going to be larger than the saturation current which can result in damage to the engine as the piston over-travels;
- the inrush currents can be provided at lower output voltage levels.

This new control system may act as a constant power source. Referring next to FIG. 4B, there is shown a schematic diagram for an approach to generating an error signal for regulation of the output voltage for a generator based on a FPSE/LA for power control. This is embodied as a power control block 150. Where the features of this approach are the same as other drawings, these are indicated by identical reference numerals. As with the voltage control block 100, a clamp controller 160 and an error compensator 130 act in parallel depending on the FPSE/LA output voltage 52. This operates in a similar fashion to the voltage control block 130. However, the error compensator 130 compares the scaled and rectified version of the FPSE/LA AC output with a DC voltage reference 170, that may be different from the DC voltage reference 135 used by the voltage control block 100. Also, the clamp controller 160 and an error compensator 130 use a different error calculation from the voltage control block 100. This will be discussed below. A single PWM power control signal 149 is provided to the AC chopper 44.

The power control method with a voltage control strategy as shown in FIG. 4B can supply inrush current for short periods of time. When the FPSE/LA voltage after the tuning capacitor 12 is lower than the desired output voltage the FPSE/LA is considered to be overloaded. This condition may occur with loads demanding inrush currents for a certain period of time. Under an overload condition the maximum power available of the generator will decrease in a quadratic way until the generator stops. This drawback has proved to be overcome by stepping the generator voltage down using an AC/AC Buck converter to deliver higher currents at lower voltages by keeping the maximum power demanded by the load below the maximum power that the FPSE/LA can supply at a constant output voltage regulation.

A Grid Independent Module (GIM) unit is based on both the voltage control block 100 and the power control block 150. The voltage control block 100 achieves power modulation of the FPSE/LA and the power control block 150 acts as a constant power source to deal with inrush currents. For the power control mode, the PWM control signal 149 controls the AC/AC Buck regulator 44. This affects the voltage seen by customer loads 30, allowing a higher current to be drawn. For the voltage control mode, the PWM control signal 148 controls the electronic load 22. This may cause the voltage output of the linear alternator 210 to be reduced, if the impedance of the electronic load 22 is reduced. The implemented PWM output signal 148 of the voltage controller can be enabled or disabled externally.

The power control mode seeks, at least in part, to mitigate the problem of inrush currents. The effect of inrush currents in the dynamics of the FPSE/LA can be explained from a mechanical viewpoint. The force acting on the piston depends on the pressure wave generated due to the Stirling cycle. A steady-state balance between the force acting on the piston and the opposing force depending on the alternator current is reached under normal conditions. The alternator from a mechanical/dynamic point of view behaves like a spring mass damper system.

To understand the effect of inrush currents the equivalent mechanical system explaining the behaviour of the linear alternator is simplified to a spring. The spring constant of the alternator is going to be dependent on the alternator saturation condition. When a current is larger than the maximum current that saturates the alternator, the spring constant is going to decrease dramatically and the piston can over-travel (the force opposing the piston movement may be much lower depending on displacement). It should be noted the engine has some spring magnets that can provide some degree of protection to overloads, but large inrush currents remains a problem with this type of generator.

A more detailed description of the operation of the controllers is now provided.

Scaling and Rectification Block

Referring to FIG. 5A, there are shown example voltage waveforms as part of the generation of an error signal, specifically an example for the waveform generated by the scaling and rectification block 110. The FPSE/LA voltage 300 is an AC sinusoidal voltage (for example, 240 Vrms). This voltage is scaled to DC levels (from 0 to 5V with a 2.5V DC offset).

Referring to FIG. 5B, there is shown an example voltage waveform as part of the generation of an error signal, specifically an example for the waveform generated by the precision rectifier. The scaled AC signal 310 is rectified to rectified signal 320, so that an error voltage can be defined. The average value, $V_{avg}$, of the rectified signal 320 is proportional to the FPSE/LA voltage 300.

Figure 11:
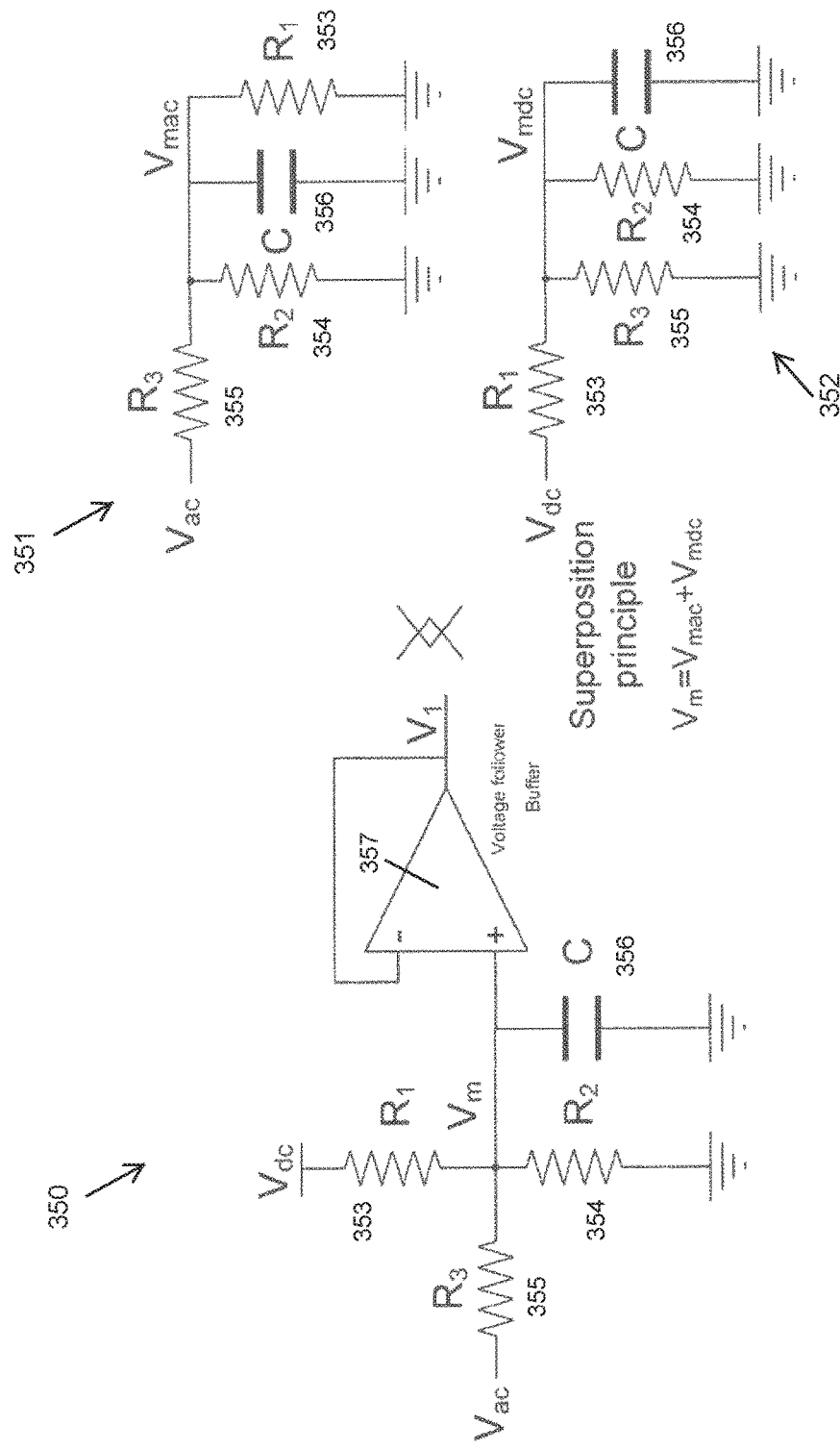
FIG. 11 depicts a circuit and equivalent circuits for scaling the voltage for use in the embodiment of FIGS. 4A and 4B.

Referring now to FIG. 11, there is depicted a circuit 350 and equivalent circuits, 351 and 352, for scaling the voltage within the range from 0 to 5V. Circuit 350 includes: resistor 353, resistor 354, resistor 355, capacitor 356 and voltage follower buffer 357. The governing equations for this circuit 350 are as follows.

$$V_{mac} = V_{ac} \frac{(R_2 // Z_C // R_1)}{R_3 + (R_2 // Z_C // R_1)} = V_{ac} \frac{R_2 Z_C R_1}{R_3(R_1 Z_C + R_2 R_1 + R_2 Z_C) + R_2 Z_C R_1}$$

$$V_{mdc} = V_{dc} \frac{(R_3 // R_2 // Z_C)}{R_1 + (R_3 // R_2 // Z_C)} = V_{dc} \frac{R_3 R_2 Z_C}{R_1(R_2 Z_C + R_3 Z_C + R_3 R_2) + R_3 R_2 Z_C}$$

Error Compensator

In voltage control mode, the error compensator 130 receives a DC voltage reference within 2.5 to 5V, representing the desired output voltage. This is shown as $V_{ref}$ in FIG. 5B. The error is defined as the FPSE/AC scaled and rectified voltage 320 minus the DC voltage reference, that is $V_{avg} - V_{ref}$. The PI error compensator 130 provides an output signal that minimizes this error.

In power control mode, a DC voltage reference within 0 to 2.5V represents the desired output voltage. The error is defined as the desired FPSE/LA AC output voltage minus the FPSE/AC scaled and rectified voltage 320, that is $V_{ref} - V_{avg}$. The error compensator 130 again provides an output signal that minimizes this error.

Analogue or digital error compensator techniques can be used. An analogue PI controller is currently used as it provides a good transient response, simplicity and low cost. Other analogue compensation strategies can be implemented, such as suggested in Chetty, P. R. K., "Modelling and design of switching regulators", IEEE Transactions on Aerospace and Electronic Systems, 1982, AES-18 (3), p. 333-344.

Figure 12:
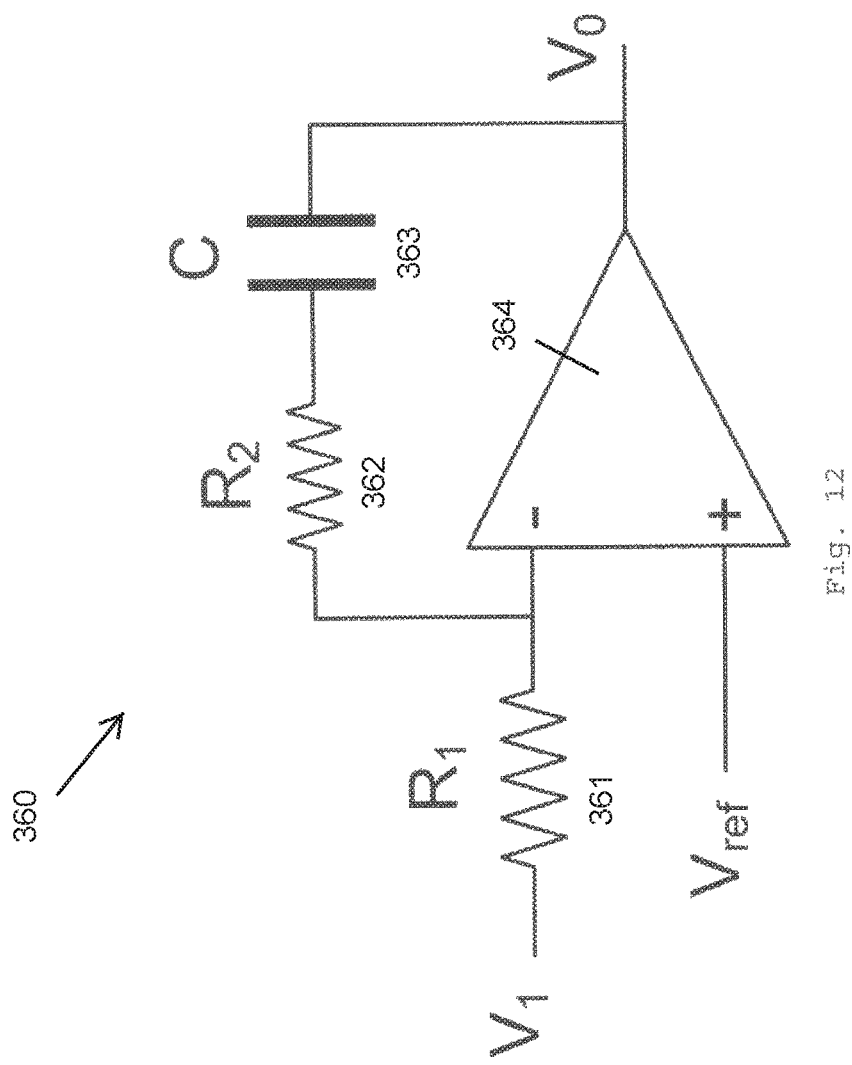
FIG. 12 shows a circuit for a Proportional-Integral controller for use in the embodiment of FIGS. 4A and 4B.

Referring then to FIG. 12, there is shown a circuit 360 for an analogue Proportional-Integral controller. Circuit 360 includes: resistor 361, resistor 362, capacitor 363 and difference amplifier 364. The frequency response of this circuit 360 is given by the following equation.

$$V_0(s) = V_{ref}(s) + \frac{\left(R_2 + \frac{1}{sC}\right)}{R_1}(V_{ref}(s) - V_1(s))$$

The time domain response of the circuit is given by the following equation.

$$V_0(t) = V_{ref} + \underbrace{\frac{R_2}{R_1}(V_{ref} - V_1(t))}_{\text{proportional action} \atop \text{error signal}} + \underbrace{\int_0^t \frac{(V_{ref} - V_1(t))}{R_1 \cdot C} dt}_{\text{Integral action} \atop \text{error signal}}$$

Clamp Controller for Voltage Control Mode

As the FPSE/LA is a low inertia generator, the clamp controller 160 (feed forward controller) is implemented to provide fast transient protection, especially if the engine voltage is higher than 260 Vrms. This can result in irreparable damage due to an overstroke. The clamp controller 160 only acts when the rectified engine voltage is higher than a certain value (for instance, 240 Vrms). This circuit ensures there is always a load present when the engine voltage is higher than a certain clamp threshold ($V_{clamp\_th}$, a predefined value is associated with 240 Vrms, for example). The clamp circuit is highly desirable when there are large step variations in the load connected to the generator as it provides protection to transient loads.

The clamp circuit provides a real time response. When the scaled and rectified FPSE/LA AC signal is greater than the clamp threshold, the clamp controller provides an output voltage proportional to the voltage difference. The error for the clamp circuit for voltage control mode is defined as:

$$\text{error}_{clamp} = \begin{cases} \text{scaled } FPSE/LA_{ac\ signal} - V_{clamp\_th} \\ 0 \text{ if } V_{clamp\_th} > \text{scaled } FPSE/LA_{ac\ signal} \end{cases}.$$

Referring next to FIG. 6A, there are shown example voltage waveforms and duty cycle characteristics for the operation of the clamp controller in voltage control mode. The duty cycle signal for the voltage control is valid for an electronic load based on a DC Buck converter. If other electronic load implementations based on different power electronic topology may require different duty cycle signal versus alternator voltage characteristics. The voltage threshold and the gain can be adjusted with a pair of potentiometers.

The rectified voltage is also used for the overvoltage protection block. An overvoltage event could occur as an example under the unlikely event of an electronic load failure. If the engine voltage is higher than, say, 260 Vrms a solid state switch or relay is triggered for a predefined period of time by a monostable. As soon as an overvoltage trip appears, the LFPSE/LA is shut down.

The duty cycle for the PWM signal can be defined for a voltage higher than the clamp threshold. A possible clamp transfer response for voltage control mode is shown in FIG. 6A.

Referring to FIG. 6B, there are shown example voltage waveforms and duty cycle characteristics for the operation of the clamp controller in power control mode. The duty cycle signal for the power/current control is valid for the AC/AC Buck converter, although again other electronic load implementations based on different power electronic topology may require different duty cycle signal versus alternator voltage characteristics. The clamp controller is modified to use an inverted version of the rectified voltage. When the scaled and rectified FPSE/LA AC signal is lower than the clamp threshold for current control (which will be less than the clamp threshold for voltage control), the clamp provides an output voltage proportional to the voltage difference.

$$\text{error}_{clamp} = \begin{cases} V_{clamp\_th} - \text{scaled } FPSE/LA_{ac\ signal} \\ 0 \text{ if scaled } FPSE/LA_{ac\ signal} > V_{clamp\_th} \end{cases}$$

The error is defined as the FPSE/AC output voltage scaled, rectified and inverted voltage minus the desired FPSE/LA AC output voltage (represented by a DC voltage value).

Figure 13:
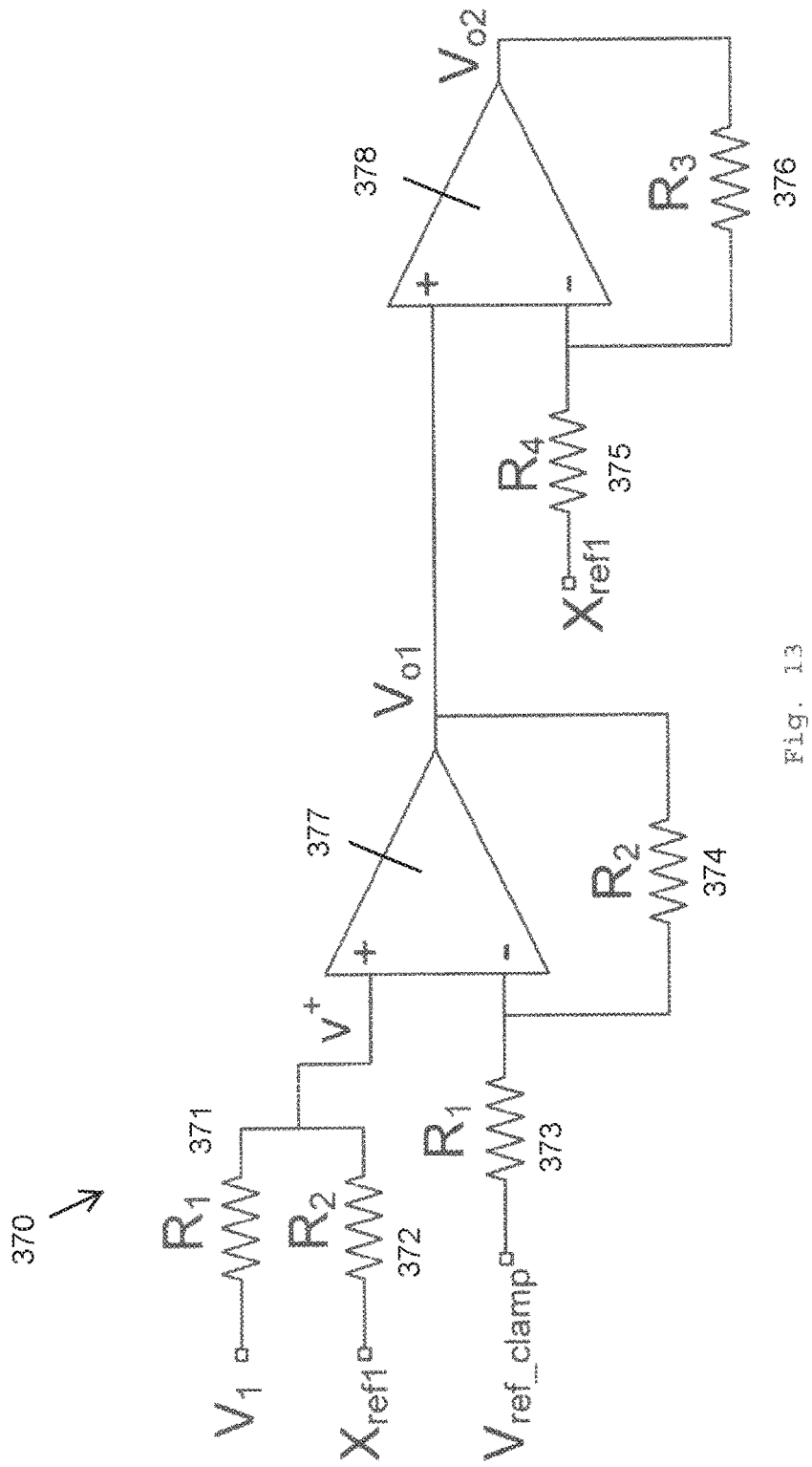
FIG. 13 shows a circuit for a clamp controller for use in the embodiment of FIGS. 4A and 4B.

Referring next to FIG. 13, there is shown a circuit 370 for a clamp controller. Circuit 370 includes: resistor 371, resistor 372, resistor 373, resistor 374, resistor 375, resistor 376, difference amplifier 377 and difference amplifier 378. Analysis of this linear circuit 370 yields the following equations.

$$v^+ = \frac{(V_1 - X_{ref_1})}{(R_1 + R_2)} R_2 + X ref_1$$

$$V_{01} = \left(1 + \frac{R_2}{R_1}\right) v^+ + V_{ref\_clamp}\left(-\frac{R_2}{R_1}\right)$$

$$V_{02} = \left(1 + \frac{R_3}{R_4}\right) V_{01} + X_{ref_1}\left(-\frac{R_3}{R_4}\right)$$

Effect of Voltage and Power Control Modes

As shown in FIG. 2E, a voltage control block 20 may achieve power modulation of the engine and a power control block 43 may cope with loads that demand high inrush currents. These two controllers operate with different error definitions, as explained above. For the voltage control the error is positive when the FPSE/LA voltage is higher than the desired reference voltage. Therefore, a higher load must be connected to the engine to minimize the error and achieve FPSE/LA output voltage regulation. For the power (current control) the error is positive when the FPSE/LA voltage is lower than the desired voltage.

Figure 7:
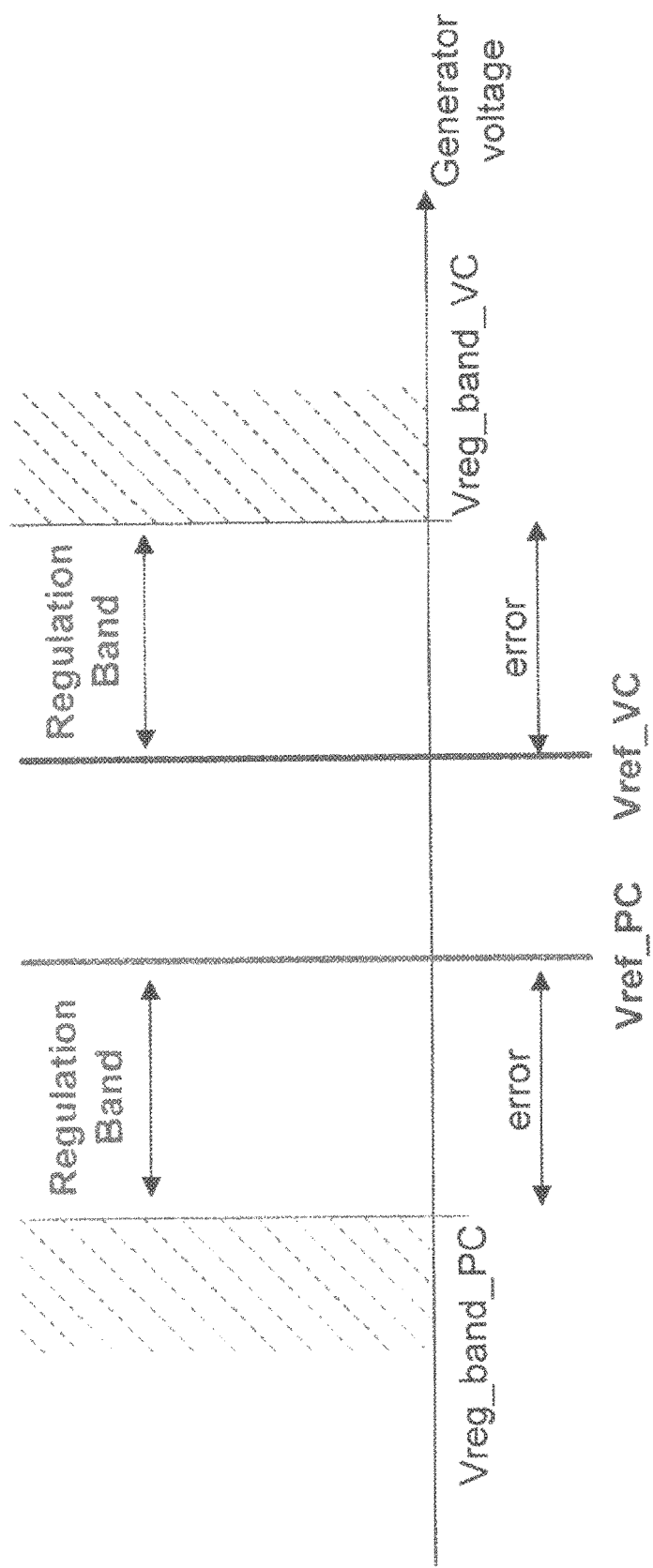
FIG. 7 shows how thresholds for controlling the operation of the embodiment of FIGS. 4A and 4B can be set for stable operation.

As a result, there are two voltage settings for each controller, identifying a voltage on or above which voltage control mode is enabled (Vref_VC) and a voltage on or below which power control mode is enabled (Vref_PC). Referring first to FIG. 7, there is shown how thresholds for controlling the operation of the controller can be set for stable operation. The reference voltage for the Voltage Control is at least few volts higher than the reference voltage for the Current/Power Control. Interactions between the Voltage Control (VC) and the Power control (PC) are avoided thereby.

The two different reference voltages implemented in this way provide hysteresis and avoid hunting (that is repeated alternation between the modes resulting from noise in the signal causing repeating crossings of the threshold). This is discussed in more detail in US-2009/224738. For example, when the FPSE/LA is operating in voltage control mode with a reference voltage of 220 Vrms, a voltage drop to 220 Vrms or below is large enough to indicate excessive current demand to cause the switch to power control mode. When the power control mode is dominant, a rise to 225 Vrms may be used to indicate the current demand is normal to cause the voltage controller to dominate instead.

Figure 8:
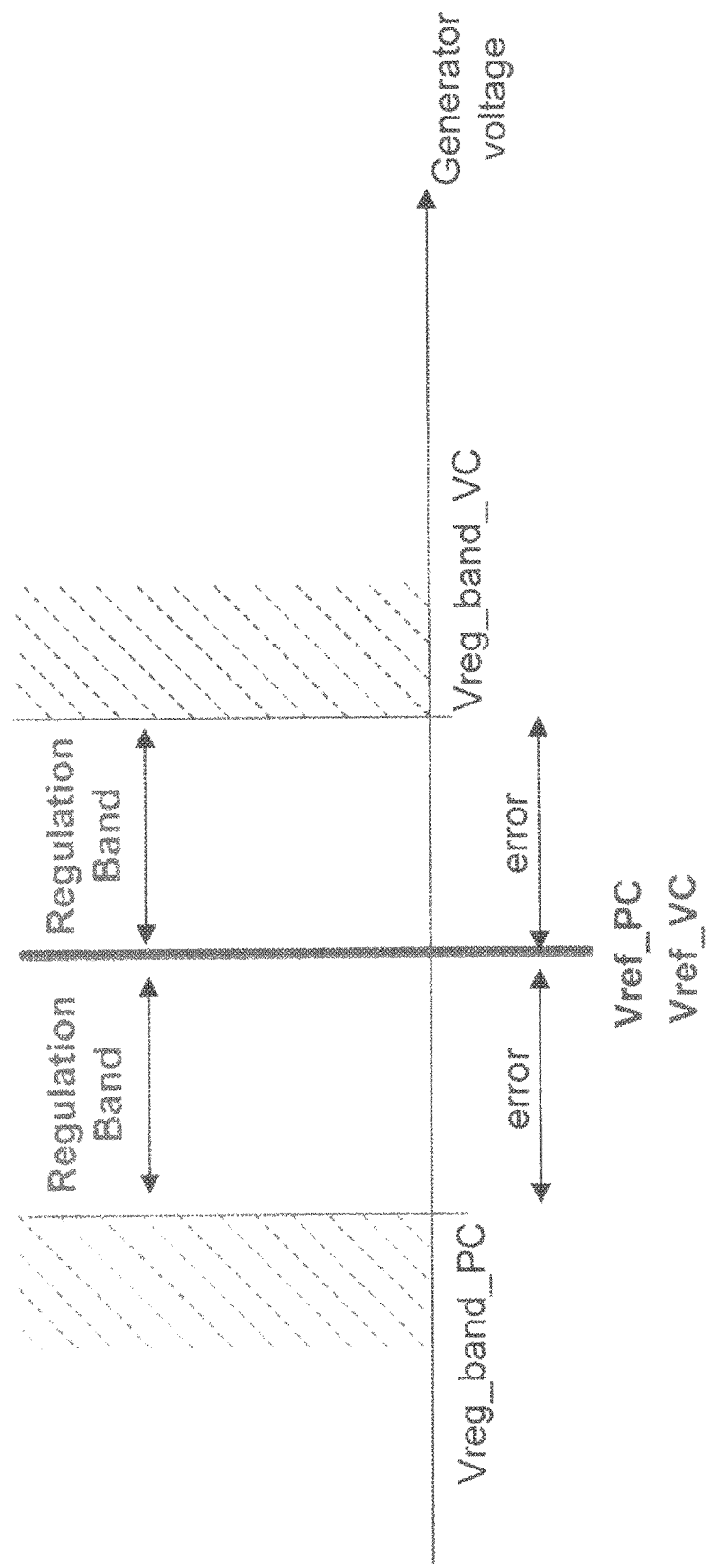
FIG. 8 shows how thresholds for controlling the operation of the embodiment of FIGS. 4A and 4B can be set where stable operation may not always be possible.

Referring then to FIG. 8, there is shown how thresholds for controlling the operation of the controller can be set where stable operation may not always be possible. Theoretically, if the voltage thresholds for the VC and PC are set to the same value (or very close values), the controller should operate without a problem. However, noise present in the FPSE/LA in a real scenario could lead to undesirable interaction between both the VC and PC algorithms. Hence, the controller could become unstable.

Figure 9:
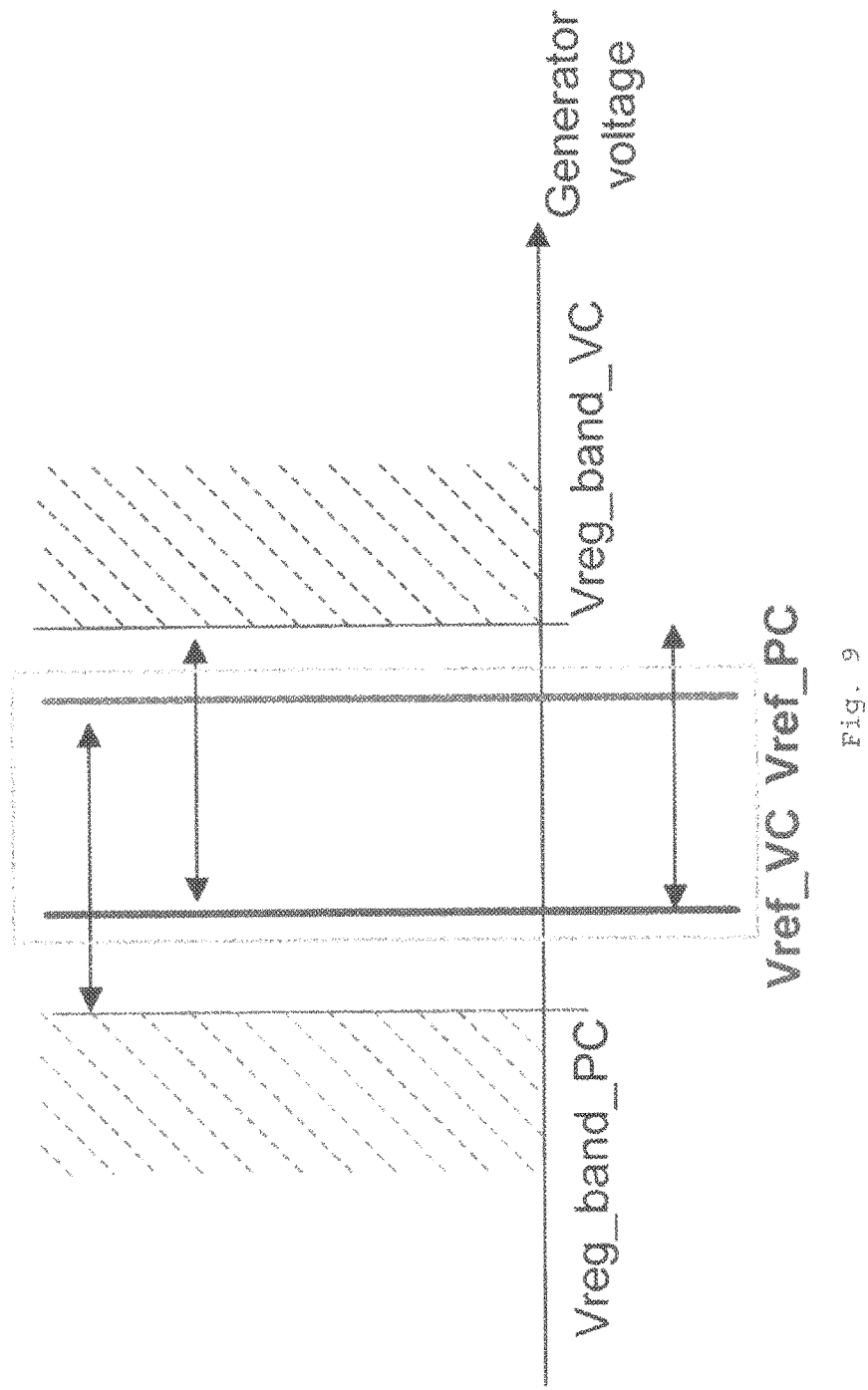
FIG. 9 shows how thresholds for controlling the operation of the embodiment of FIGS. 4A and 4B can be set for unstable operation.
Figure 10:
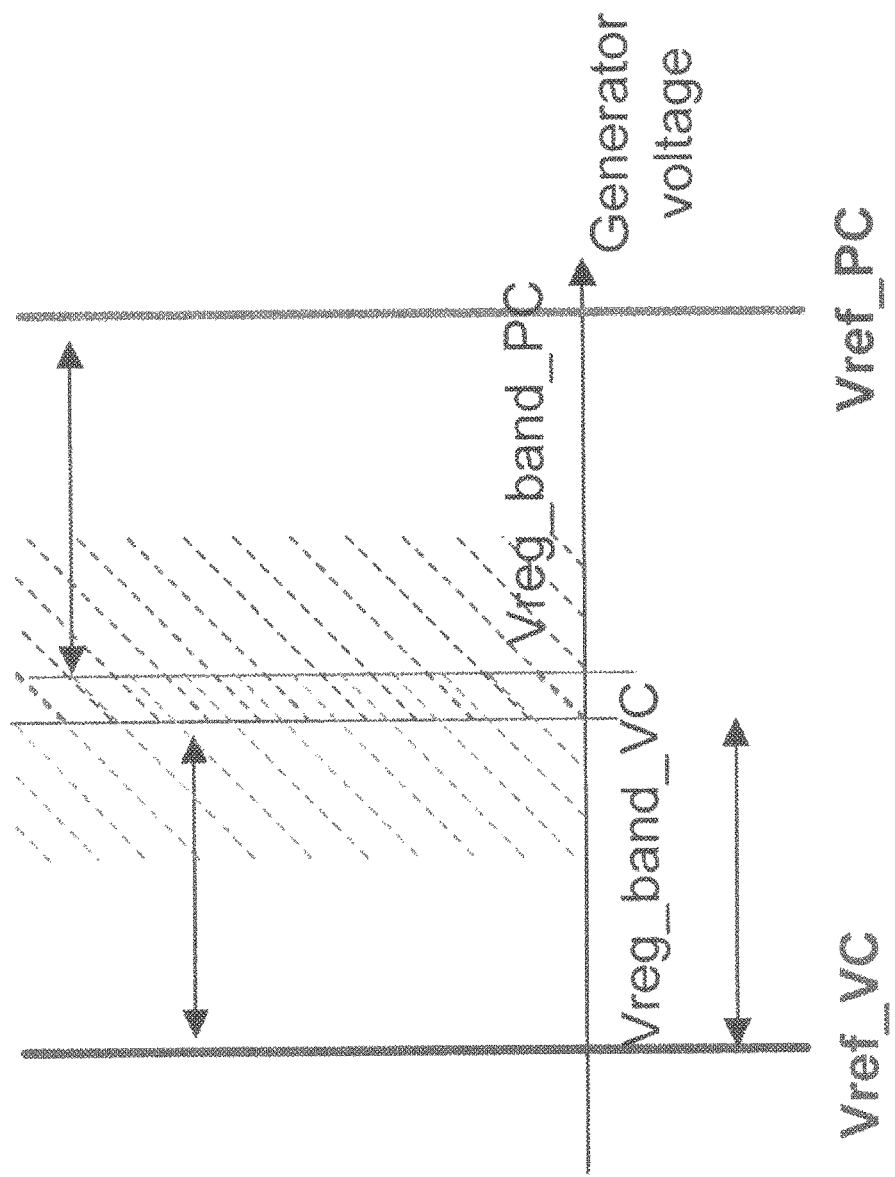
FIG. 10 shows how thresholds for controlling the operation of the embodiment of FIGS. 4A and 4B can be set such that stable operation is never possible.

Referring now to FIG. 9, there is shown how thresholds for controlling the operation of the controller can be set for unstable operation. Hunting is likely to occur in this case. Referring finally to FIG. 10, there is shown how thresholds for controlling the operation of the controller can be set such that stable operation is never possible. The power (current) control mode is always active, stepping down the voltage in the customer loads.

Ramp Generator

Figure 14:
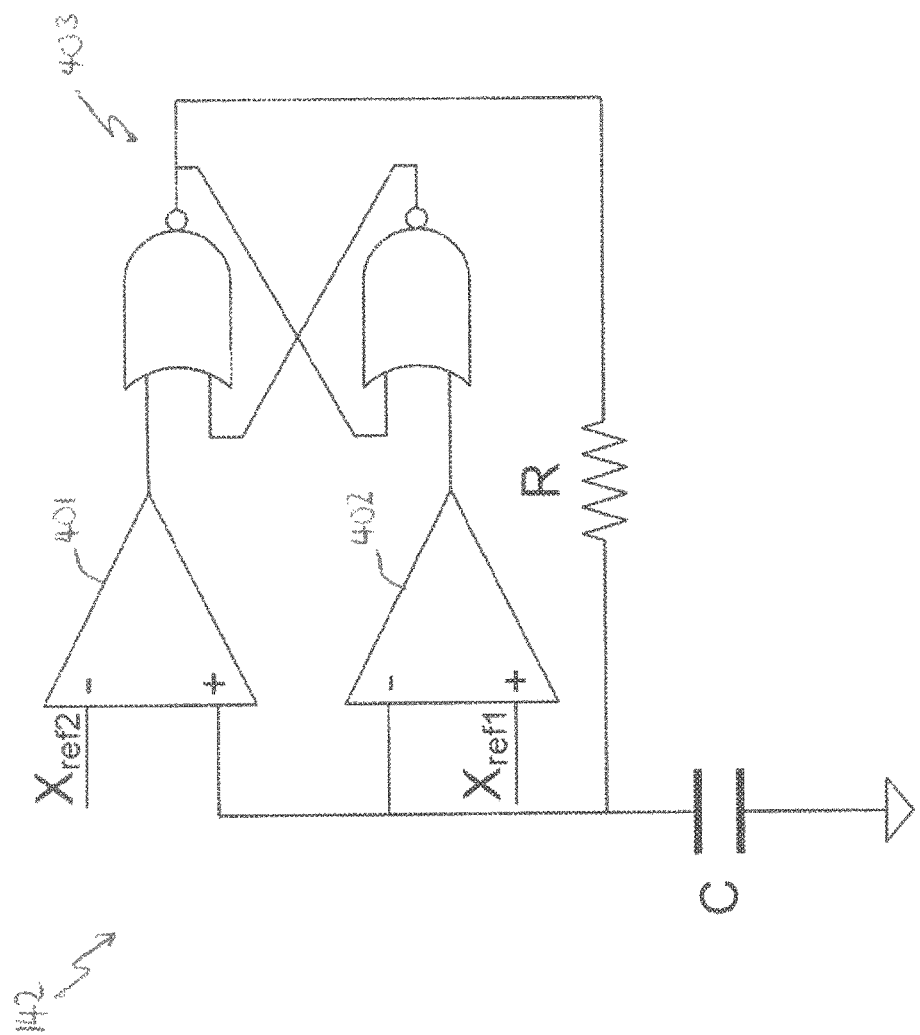
FIG. 14 shows a circuit for a ramp generator for use in the embodiment of FIGS. 4A and 4B.

Referring now to FIG. 14, there is shown a circuit for a ramp generator. The ramp generator is implemented using two comparators 401, 402 and one RS flip flop 403. The oscillation period, T, follows the following equations.

$$T = T_{charge} + T_{discharge}, \text{ where}$$

$$T_{discharge} = \tau \cdot \ln\left(\frac{X_{ref_1}}{X_{ref_2}}\right) \text{ and}$$

$$T_{charge} = \tau \cdot \ln\left(\frac{X_{ref_2} - V_s}{X_{ref_1} - V_s}\right).$$

Electronic Load

An electronic load is a variable load that exploits the electrical characteristics of a power electronic topology. This is used for voltage-control.

Figure 15:
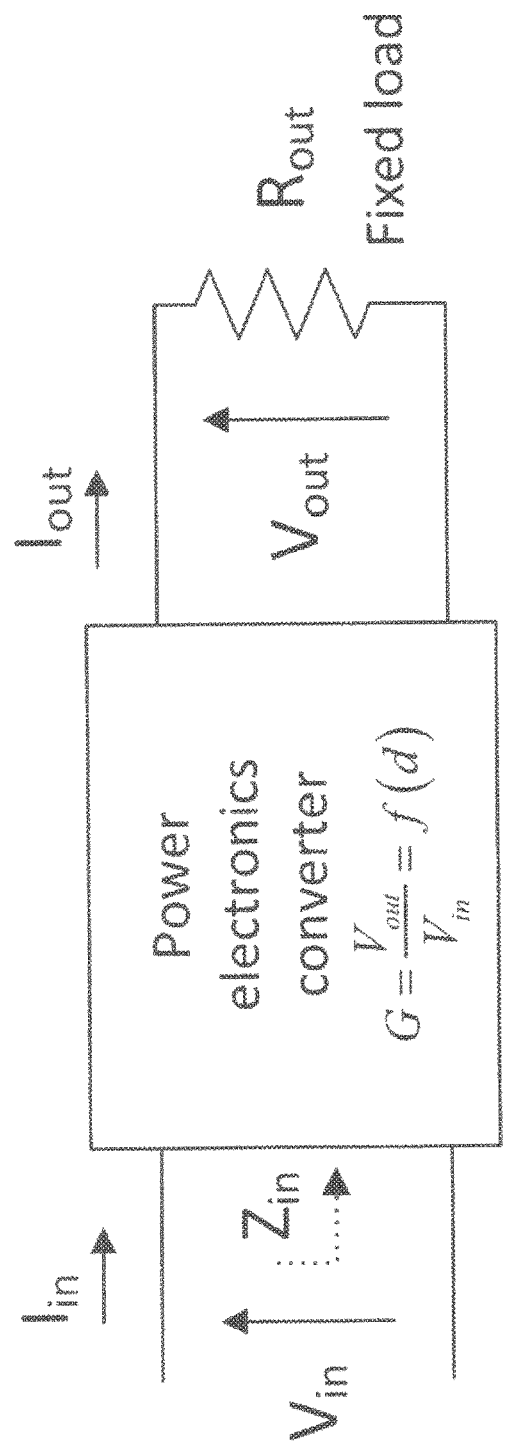
FIG. 15 illustrates a generalised electronic load for use in the embodiment of FIGS. 4A and 4B.

Referring to FIG. 15, there is illustrated a generalised electronic load, comprising a power electronics converter coupled to a fixed load. Depending on the type of power electronic topology and mode of operation of the electronic load, the Gain function (G) may be different and the resultant impedance relationship will vary accordingly. For example, a buck converter operating in CCM (Continuous Conduction Mode) will receive a PWM signal with a duty cycle defined as d, which is a variable within the range [0,1]. Then, its Gain will be defined as $$G = \frac{V_{out}}{V_{in}} = d.$$

For a boost converter in CCM, the Gain will be defined as $$G = \frac{V_{out}}{V_{in}} = \frac{1}{1-d}.$$

For an isolated converter such as a flyback in CCM, the gain is a function of the duty cycle and the transformer windings ratio, n.

$$G = \frac{V_{out}}{V_{in}} = \frac{1}{1-d} \cdot n = f(d, n).$$

For other converters, the Gain functions can also be determined.

In general, it can therefore be seen that the output voltage of the electronic load is a function of the duty cycle, as given by the following relationship:

$$V_{out} = V_{in} \cdot G = V_{in} \cdot f(d).$$

The following relationships are well known.

$$P_{in} = V_{in} \cdot I_{in} = \frac{V_{in}^2}{R_{in}} \quad P_{out} = V_{out} \cdot I_{out} = \frac{V_{out}^2}{R_{out}}$$

Using these and assuming a lossless power transformation ($P_{out}=P_{in}$ or equivalently, $\eta=P_{out}/P_{in}\approx 1$), the relationship between the input and output impedance can also be determined. Usually, the converter shows a performance less than 1 but we can assume it is one.

$$P_{in} = \frac{V_{in}^2}{R_{in}} = P_{out} = \frac{(V_{in} \cdot f(d))^2}{R_{out}}$$

$$\frac{V_{in}^2}{R_{in}} = \frac{V_{in}^2 \cdot f^2(d)}{R_{out}}$$

$$R_{in} = \frac{R_{out}}{f^2(d)}$$

Then, specific relationships can be identified for a specific electronic load with a specific f(d). For a buck converter in CCM:

$$f(d) = d \text{ and }$$

$$R_{in} = \frac{R_{out}}{f^2(d)} = \frac{R_{out}}{d^2}.$$

For a boost converter in CCM:

$$f(d) = \frac{1}{1-d} \text{ and }$$

$$R_{in} = \frac{R_{out}}{f^2(d)} = R_{out}(1-d)^2.$$

For a flyback in CCM:

$$R_{in} = \frac{R_{out}}{f^2(d, n)} = R_{out}\frac{(1-d)^2}{n^2 \cdot d^2}$$

As can be seen, the input impedance for a flyback converter (with galvanic isolation) is a function of the transformer winding ratio and the duty cycle.

An electronic load can therefore be implemented with any type of power electronic topology. However, the buck converter has advantages in terms of simplicity and cost. If any reason (such as safety regulations) dictates that galvanic isolation is required for the fixed load (which may be an immersion heater), then another type of converter such as a half-bridge or push-pull could be used instead of the buck converter.

Figure 16:
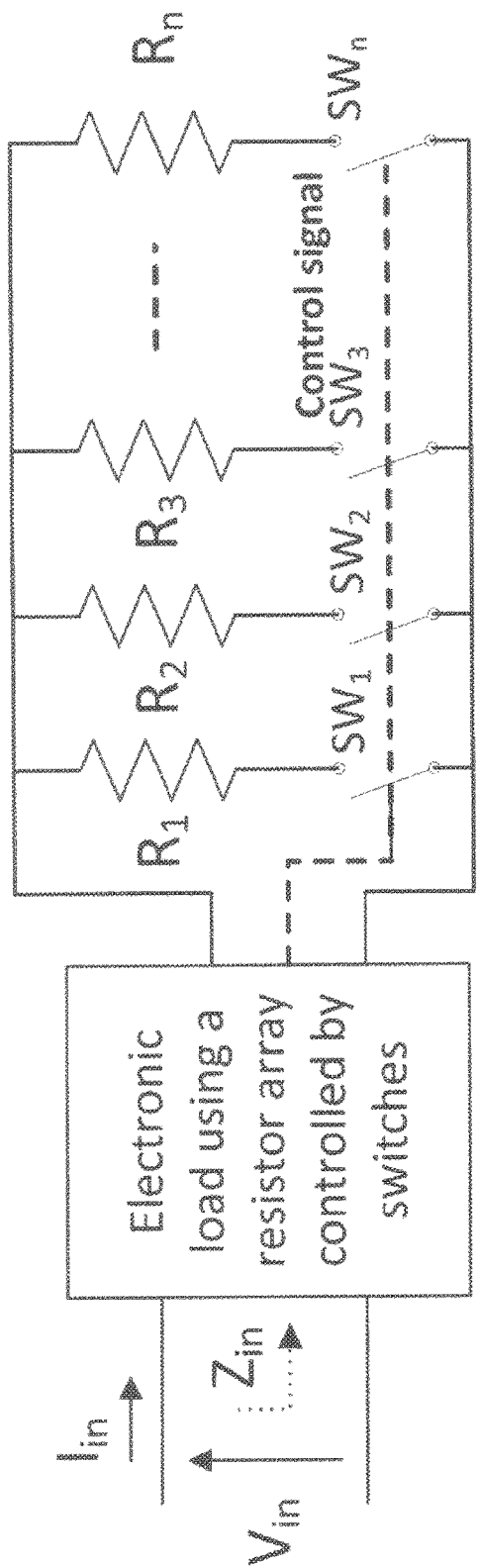
FIG. 16 shows a non-preferred design of electronic load.

Another form of electronic load may use a variable autotransformer, with its wiper being moved to step up or down the voltage connected to the fixed load. Referring next to FIG. 16, there is shown an alternative type of electronic load to a DC chopper and variable autotransformer. A discrete number of resistors ($R_1, R_2, \ldots, R_n$) are provided in parallel, with each resistor being coupled to a respective switch ($SW_1, SW_2, \ldots, SW_n$) that controls whether current passes through the resistor. These may be relays or solid state switches. A control block provides a control signal (or signals) to operate or deactivate the switches accordingly. However, this approach is bulky, costly and generally cannot achieve fine voltage regulation (as only discrete steps are possible).

AC Converter

For the power control (current control) of AC loads, any AC converter may be used. If the load is supplied with AC, an AC/AC converter is used. This may be based on bidirectional switches or high frequency links. The type of AC/AC converter used may depend on the type of load.

The principle of operation is similar to that of the electronics load. The input impedance can be controlled by using a control signal (with a duty cycle). For the case of AC loads such as the GIM unit, the simplest AC/AC converter or power electronic topology to implement is a buck converter. The AC/AC buck converter in continuous conduction mode (CCM) shows a gain proportional to the duty cycle. The voltages however are normally sinusoidal though, compared with the traditional DC buck. According to the gain function (shown below), the input impedance can be controlled by changing the duty cycle:

$$G = \frac{V_{out}}{V_{in}} = d.$$

Thus, the impedance relationship is also controlled by the duty cycle.

$$R_{in} = \frac{R_{out}}{f^2(d)} = \frac{R_{out}}{d^2}$$

However, there are many types of power electronics topology for AC converters, which may include: AC/AC boost; AC/AC buck boost; and AC/AC with isolation topologies (full bridge). For example, where the AC load requires galvanic isolation, an AC/AC full bridge is desirably used.

Essentially, the same concepts as applied to the electronic load can also be applied to the AC converter. Although any power electronic topology may be suitable, economic constraints, reliability constraints (number of switches, stresses in the semiconductors) and other issues may limit the selection of AC converter topology. In the embodiment of FIG. 4B, the AC/AC buck was selected in view of these issues.

Alternatives

Whilst a specific embodiment has been described, the skilled person may contemplate various modifications and substitutions. For example, slow response and fast response controllers may be used. Even if the fast response controller is a clamp controller, the slow response controller need not be a PI controller, as a proportional controller or a PID controller can be used, for instance.

Both voltage-control and current-control are provided in the preferred embodiment. Nevertheless, it will be understood that alternatives may be possible. In particular, other implementations may provide voltage-control only or current-control only and it may be possible to implement each or both selectively.

Whilst PWM control signals are used in the embodiment described herein (with some advantages), other types of signal may be used instead. The circuits for the components of the voltage control block and current control block can differ from those described above and the common components of the voltage control block and current control block may be different from those suggested herein, for practical or efficiency reasons. Analogue circuitry, digital circuitry and a combination of the two can be used to implement the invention. Programmable logic, firmware or software can be used in addition or as an alternative.

The invention claimed is:
1. A regulator for the electrical output of a generator, comprising:
an input part for receiving a signal indicative of a voltage of the electrical output;
a relatively fast-response controller configured to provide a first control signal on the basis of the voltage, wherein the first control signal comprises a first PWM signal;
a relatively slow-response controller configured to provide a second control signal on the basis of the voltage, wherein the second control signal comprises a second PWM signal; and
an output part, arranged to provide a combined control signal to adjust the electrical output based on the first and second control signals, comprising a logical OR gate configured to generate the combined control signal by performing a logical OR operation on the first control signal and the second control signal,
wherein the generator comprises a Stirling engine and wherein the first control signal and the second control are generated in parallel.
2. The regulator of claim 1, wherein the relatively fast-response controller comprises a feedforward controller.
3. The regulator of claim 1, wherein the relatively slow-response controller comprises an error compensator controller.
4. The regulator of claim 3, wherein the relatively slow-response controller comprises a form of Proportional-Integral-Derivative, PID, controller.
5. The regulator of claim 1, wherein the relatively slow-response controller uses a DC level as a reference.
6. The regulator of claim 1, wherein the signal indicative is further indicative of at least one of current and power of the electrical output.
7. The regulator of claim 1, wherein the combined control signal is used to adjust voltage of the electrical output.
8. The regulator of claim 7, wherein the relatively fast-response controller is configured to provide the first control signal on the basis of the voltage.
9. The regulator of claim 7, wherein the relatively slow-response controller is configured to provide the second control signal on the basis of the voltage.
10. The regulator of claim 1, wherein each of the relatively fast-response controller and the relatively slow-response controller being configured to generate a respective error signal by comparing the voltage with a respective reference voltage and being further configured to generate the respective control signal so as to minimize the respective error signal.
11. The regulator of claim 1, wherein the combined control signal comprises at least one Pulse Width Modulation, PWM, signal.
12. The regulator of claim 1, wherein the input part comprises terminals configured to receive the electrical output from the electrical generator, the regulator further comprising:
an electronic load, arranged across the input terminals and configured to receive the combined control signal from the output part and to set a resistance of the electronic load based on the received combined control signal, thereby adjusting the electrical output.
13. The regulator of claim 12, wherein the combined control signal is used to adjust the current of the electrical output based on the first and second control signals.
14. The regulator of claim 1, wherein the input part comprises terminals configured to receive the electrical output from the electrical generator, the regulator further comprising:
an AC converter, arranged at the input terminals and configured to receive the combined control signal from the output part and to adjust the electrical output in accordance with the received combined control signal.
15. The regulator of claim 14, wherein the combined control signal is used to adjust the current and the voltage of the electrical output; and
wherein the AC converter is only responsive to voltage control in the combined control signal.
16. The regulator of claim 1, wherein the input part is configured to receive the electrical output from the generator and wherein the input part comprises a signal processing module arranged to generate a second signal indicative of the voltage by processing of the electrical output, the relatively fast-response controller and the relatively slow-response controller being responsive to the second signal indicative of the voltage.
17. A method of regulating the electrical output of a generator, comprising:
receiving a signal indicative of a voltage of the electrical output;
generating a first control signal on the basis of the voltage using a relatively fast-response controller, wherein the first control signal comprises a first PWM signal;
generating a second control signal on the basis of the voltage using a relatively slow-response controller, wherein the second control signal comprises a second PWM signal;
generating a combined control signal by performing a logical OR operation on the first control signal and the second control signal; and
adjusting the electrical output using the combined control signal,
wherein the generator comprises a Stirling engine and wherein the first control signal and the second control signal are generated in parallel.
18. A computer program, configured when operated on a processor to carry out the method of claim 17.
19. A regulator for the electrical output of a generator, comprising:
an input part for receiving a signal indicative of a voltage of the electrical output;
a relatively fast-response controller comprising a feedforward controller configured to provide a first control signal on the basis of the voltage;
a relatively slow-response controller comprising an error compensator configured to provide a second control signal on the basis of the voltage; and
an output part, arranged to provide a combined control signal to adjust the electrical output based on the first and second control signals,
wherein the generator comprises a Stirling engine and wherein the first control signal and the second control signal are generated in parallel and combined to obtain the combined control signal.
20. A regulator for the electrical output of a generator according to claim 19, further comprising:

a triangle/ramp generator adapted to generate at least one of a triangle signal and a ramp signal;

a first comparator adapted to compare the first control signal to the signal generated by the triangle/ramp generator;

a second comparator adapted to compare the second control signal to the signal generated by the triangle/ramp generator; and a logical OR gate adapted to generate the control signal by performing a logical OR operation on the output of the first comparator and the output of the second comparator.

* * * * *